(12) United States Patent
Zhang et al.

(10) Patent No.: US 12,250,748 B2
(45) Date of Patent: Mar. 11, 2025

(54) COMMUNICATION METHOD AND APPARATUS

(71) Applicant: HUAWEI TECHNOLOGIES CO., LTD., Guangdong (CN)

(72) Inventors: Zhanzhan Zhang, Shanghai (CN); Xiaolei Tie, Shanghai (CN); Han Zhou, Shanghai (CN); Wenwen Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 514 days.

(21) Appl. No.: 17/587,297

(22) Filed: Jan. 28, 2022

(65) Prior Publication Data
US 2022/0151017 A1 May 12, 2022

Related U.S. Application Data

(63) Continuation of application No. PCT/CN2020/105483, filed on Jul. 29, 2020.

(30) Foreign Application Priority Data

Aug. 2, 2019 (CN) .......................... 201910713049.4

(51) Int. Cl.
H04W 76/28 (2018.01)
H04L 27/26 (2006.01)
(Continued)

(52) U.S. Cl.
CPC ....... *H04W 76/28* (2018.02); *H04L 27/26025* (2021.01); *H04W 72/0446* (2013.01); *H04W 72/23* (2023.01)

(58) Field of Classification Search
CPC . H04W 76/28; H04W 72/0446; H04W 72/23; H04W 52/0216; H04W 52/0229; H04L 27/26025; Y02D 30/70
(Continued)

(56) References Cited

U.S. PATENT DOCUMENTS

| 2018/0368112 | A1 | 12/2018 | Sebeni et al. | |
| 2020/0389874 | A1* | 12/2020 | Lin | H04W 72/23 |
| 2022/0159574 | A1* | 5/2022 | Islam | H04W 52/0219 |

FOREIGN PATENT DOCUMENTS

| CN | 106899941 A | 6/2017 |
| CN | 109429258 A | 3/2019 |
| CN | 109963339 A | 7/2019 |

OTHER PUBLICATIONS

International Search Report and Written Opinion issued in PCT/CN2020/105483, dated Oct. 21, 2020, 10 pages.
(Continued)

*Primary Examiner* — Rownak Islam

(57) ABSTRACT

A communication method and an apparatus are disclosed. The method includes: A first communications device receives first DCI from a network device in a first discontinuous reception active time, where the first DCI is used to indicate new uplink or downlink data transmission; the first communications device does not expect to receive a PDCCH from the network device in a first time period after the first discontinuous reception active time, where a start moment of the first time period is an end moment of the first discontinuous reception active time, and an end moment of the first time period is in a second discontinuous reception active time; and the first communications device monitors the PDCCH after the first time period.

16 Claims, 17 Drawing Sheets

(51) Int. Cl.
*H04W 72/0446* (2023.01)
*H04W 72/23* (2023.01)

(58) Field of Classification Search
USPC .......................................................... 370/329
See application file for complete search history.

(56) References Cited

OTHER PUBLICATIONS

Apple Inc: "Design of PDCCH based Power Saving Signal and Channel",3GPP Draft; R1 1904985 Design of PDCCH Based Powersaving Signal and Channel, 3rd Generation Partnership-Project (3GPP), Mobile Competence Centre;650, Route Deslucioles;F-06921 Sophia-Antipolis Cedex;France,vol. RAN WG1 No. Xi''an, China; Apr. 8, 2019 Apr. 12, 2019 Apr. 3, 2019(Apr. 3, 2019), XP051707359,Retrieved from the Internet:U RL:http://www.3gpp.org/ftp/tsg%SFran/WG 1 %5FRL1 /Tsg R 1 %5F96b/Docs/R1 %2D1904985%2Ezip [retrieved Apr. 3, 2019].
CATT: "Report on [105bis#27][N R/Power Saving] PDCCH skipping",3GPP Draft; R2-1908072 Emaildisc-27} PDCCH-Skipping-Summary Final, 3rd Generation Partnership Project(3GPP), Mobile Competence Centre;650, Route Deslucioles;F-06921 Sophia-Antipolis Cedex;France,vol. RAN WG2, No. Reno, Nevada, USA; May 13, 2019 May 17, 2019 May 13, 2019 (May 13, 2019), XP051731478, Retrieved from the Internet: 26 pages.
Extended European Search Report issued in EP20850023.1, dated Sep. 28, 2022, 15 pages.

\* cited by examiner

COMMUNICATION METHOD AND APPARATUS

CROSS-REFERENCE TO RELATED APPLICATION

This application is a continuation of International Application No. PCT/CN2020/105483, filed on Jul. 29, 2020, which claims priority to Chinese Patent Application No. 201910713049.4, filed on Aug. 2, 2019. The disclosures of the aforementioned applications are hereby incorporated by reference in their entireties.

TECHNICAL FIELD

This application relates to the field of communications technologies, and in particular, to a communication method and apparatus.

BACKGROUND

In an existing technology, if user equipment (UE) receives downlink control information (DCI) at an end of discontinuous reception active time (DRX active time), and the DCI is used to indicate new uplink or downlink data transmission, a network device starts a discontinuous reception inactivity timer (drx-InactivityTimer) on a first symbol after a symbol on which a physical downlink control channel (PDCCH) for transmitting the DCI is located. However, for the UE, the UE learns, only after successfully parsing the DCI, whether the DCI indicates new uplink or downlink data transmission. If the DCI indicates new uplink or downlink data transmission, the UE starts the drx-InactivityTimer. In this case, the UE still counts a timing value of the timer from the first symbol after the symbol on which the PDCCH is located.

However, because time used by the UE to parse the DCI may exceed the discontinuous reception active time, for a time period that exceeds the discontinuous reception active time and in which the UE is still parsing the DCI, there is a problem that the network device and the UE have inconsistent understanding of the discontinuous reception active time. In one aspect, the network device considers that the time period is discontinuous reception active time because the drx-InactivityTimer is running. In another aspect, because the UE has not successfully parsed the DCI and the drx-InactivityTimer is not started, the UE considers that the time period is not discontinuous reception active time. If the network device sends the DCI on the PDCCH in the time period to schedule the UE, the UE misses the PDCCH. Consequently, network resources are wasted, power consumption is wasted, and a data delay of the UE is also increased.

The time used by the UE to parse the DCI may exceed the discontinuous reception active time due to the following two reasons:

(1) Current downlink scheduling and uplink scheduling are respectively limited by minimum K0 and minimum K2. Before the UE successfully parses the DCI, the UE does not know whether the to-be-parsed DCI indicates downlink scheduling or uplink scheduling. Therefore, if the UE wants to successfully parse the DCI before scheduled data, parsing time of the UE is limited to a smaller value of minimum K0 and minimum K2. In addition, for a case in which a PUSCH is scheduled by using DCI, after successfully parsing the DCI, the UE further needs to reserve time for preparing to-be-sent uplink data. Therefore, if minimum K2 is less than minimum K0, the UE generally does not prolong the parsing time to an end of a slot N+minimum K2−1, but reserves time for preparing the data. If minimum K2 is greater than minimum K0, for downlink scheduling and uplink scheduling, the UE may prolong the DCI parsing time to a slot corresponding to N+minimum K0−1, for example, may prolong the DCI parsing time to an end moment of the slot corresponding to N+minimum K0−1. minimum K0 represents a minimum value of the slot interval between the PDCCH and a physical downlink shared channel (PDSCH), minimum K2 represents a minimum value of the slot interval between the PDCCH and a physical uplink shared channel (PUSCH), and N is a slot number of a slot in which the DCI is located.

Generally, minimum K2 is greater than or equal to minimum K0. Embodiments of this application are also based on this assumption.

(2) UE capability limitation. For example, when a subcarrier spacing (SCS) is relatively large (for example, SCS=120 kHz), the shortest time used by the UE to parse the DCI may need to be 2 to 3 slots.

As shown in FIG. 1, in a last slot of on duration, the network device schedules the UE by transmitting the DCI on the PDCCH, where the DCI indicates new downlink data transmission. Because minimum K0=2, the time used by the UE to parse the DCI may last to a slot after the on duration. According to an existing protocol, the network device starts the drx-InactivityTimer on a first symbol after a symbol on which the PDCCH is located, and the network device considers, according to the existing protocol, that the UE is in discontinuous reception active time during running of the drx-InactivityTimer. However, if the UE is in a DCI parsing state in the slot after the on duration, and the UE has exited discontinuous reception active time in this case, the UE considers that the slot is not discontinuous reception active time, and therefore the UE does not monitor the PDCCH. If the network device sends the DCI on the PDCCH in the slot to schedule the UE, the UE misses the PDCCH. Consequently, network resources are wasted, power consumption is wasted, and a data delay of the UE is also increased.

SUMMARY

Embodiments of this application provide a communication method and an apparatus, to resolve a problem that a network device and UE have inconsistent understanding of discontinuous reception active time.

According to a first aspect, an embodiment of this application provides a communication method, and the method includes: A first communications device receives first downlink control information (DCI) from a network device in a first discontinuous reception active time, where the first DCI is used to indicate new uplink or downlink data transmission; the first communications device does not expect to receive a physical downlink control channel (PDCCH) from the network device in a first time period after the first discontinuous reception active time, where a start moment of the first time period is an end moment of the first discontinuous reception active time, and an end moment of the first time period is in a second discontinuous reception active time; and the first communications device monitors the PDCCH after the first time period.

In the foregoing method, behavior of UE is specified. It is specified that the UE does not expect to receive a PDCCH in a first time period after current discontinuous reception active time, and the network device does not send the PDCCH in the first time period, so that a problem that the network device and the UE have inconsistent understanding of whether the first time period is in the discontinuous reception active time because DCI parsing time exceeds the current discontinuous reception active time can be avoided, network resources can be saved, and power consumption waste can be avoided.

In an example embodiment, the first communications device receives at least one piece of first DCI from the network device in a second time period in the first discontinuous reception active time, and the first communications device does not receive the first DCI from the network device in a last but X−1 slot of the first discontinuous reception active time. X is an integer, X=minimum K0, or X=Z, or X=max(minimum K0, Z), minimum K0 represents a minimum value of the slot interval between the PDCCH and a physical downlink shared channel (PDSCH), Z represents a first constant value, Z is a positive integer, a start moment of the second time period is a start moment of a last but X−2 slot of the first discontinuous reception active time, and an end moment of the second time period is the end moment of the first discontinuous reception active time.

In an example embodiment, a length of the first time period is X-y slots. A first piece of first DCI received by the first communications device in the second time period is located in a last but y−1 slot of the first discontinuous reception active time, y<X, and y is a positive integer.

In the foregoing embodiment, the first communications device can successfully parse the DCI in the first time period or at the end moment of the first time period.

It should be understood that if the first communications device receives the first DCI from the network device in the last but X−1 slot of the first discontinuous reception active time, y=X, and in this case, the first communications device can successfully parse the first DCI in the first discontinuous reception active time, in other words, parsing time of the first DCI does not exceed first discontinuous reception on duration, the first time period is 0, and a problem that the network device and the first communications device have inconsistent understanding of the discontinuous reception active time does not appear. If the first communications device receives the first DCI from the network device in a slot (for example, a last but X slot) before the last but X−1 slot of the first discontinuous reception active time, y>X, and in this case, the first communications device can successfully parse the first DCI in the first discontinuous reception active time, in other words, parsing time of the first DCI does not exceed first discontinuous reception on duration, the first time period does not exist, and a problem that the network device and the first communications device have inconsistent understanding of the discontinuous reception active time does not appear.

In an example embodiment, a length of the first time period is M slots. M=minimum K0−1, or M=Z−1, or M=max(minimum K0, Z)−1, where minimum K0 represents the minimum value of the slot interval between the PDCCH and the PDSCH, Z represents the first constant value, and Z is a positive integer.

In the foregoing embodiment, the first communications device can successfully parse the DCI in the first time period or at the end moment of the first time period.

In an example embodiment, the first constant value Z is associated with a subcarrier spacing, a first constant value corresponding to a first subcarrier spacing is greater than or equal to a first constant value corresponding to a second subcarrier spacing, and the first subcarrier spacing is greater than the second subcarrier spacing.

In the foregoing embodiment, the first communications device can successfully parse the DCI in the first time period or at the end moment of the first time period.

According to a second aspect, an embodiment of this application provides a communication method, and the method includes: A first communications device receives first DCI from a network device in a first discontinuous reception active time, where the first DCI is used to indicate new uplink or downlink data transmission; and the first communications device starts or restarts a discontinuous reception inactivity timer at a start moment of a slot corresponding to a sum of X and a slot number of a slot in which the first DCI is located, where X is an integer greater than or equal to 0.

In the foregoing method, start time of the drx-InactivityTimer is modified, and both the network device and UE simultaneously start or restart the drx-InactivityTimer after the UE successfully parses DCI, so that a problem that the network device and the UE have inconsistent understanding of discontinuous reception active time can be avoided.

In an example embodiment, X=minimum K0, or X=Z, or X=max(minimum K0, Z), where minimum K0 represents a minimum value of the slot interval between a PDCCH and a PDSCH, and Z represents a first constant value.

In the foregoing embodiment, the first communications device can successfully parse the DCI before the drx-InactivityTimer is started.

In an example embodiment, the first constant value Z is associated with a subcarrier spacing, a first constant value corresponding to a first subcarrier spacing is greater than or equal to a first constant value corresponding to a second subcarrier spacing, and the first subcarrier spacing is greater than the second subcarrier spacing.

In the foregoing embodiment, the first communications device can successfully parse the DCI before the drx-InactivityTimer is started.

According to a third aspect, an embodiment of this application provides a communication method, and the method includes: A network device sends first DCI to a first communications device in a first discontinuous reception active time, where the first DCI is used to indicate new uplink or downlink data transmission; the network device does not send a PDCCH to the first communications device in a first time period after the first discontinuous reception active time; and the network device sends the PDCCH to the first communications device after the first time period; where a start moment of the first time period is an end moment of the first discontinuous reception active time, and an end moment of the first time period is in second discontinuous reception on duration.

In the foregoing method, the network device does not send the PDCCH in the first time period, so that a problem that the network device and UE have inconsistent understanding of whether the first time period is in discontinuous reception active time because DCI parsing time exceeds the current discontinuous reception active time can be avoided, network resources can be saved, and power consumption waste can be avoided.

In an example embodiment, that a network device sends first DCI to a first communications device in a first discontinuous reception active time includes: The network device sends at least one piece of first DCI to the first communications device in a second time period in the first discontinuous reception active time, and the network device does not send the first DCI to the first communications device in a last but X−1 slot of the first discontinuous reception active time; where X is an integer, X=minimum K0, or X=Z, or X=max(minimum K0, Z), minimum K0 represents a minimum value of the slot interval between the PDCCH and a PDSCH, Z represents a first constant value, Z is a positive integer, a start moment of the second time period is a start moment of a last but X−2 slot of the first discontinuous reception active time, and an end moment of the second time period is the end moment of the first discontinuous reception active time.

In an example embodiment, a length of the first time period is X−y slots. A first piece of first DCI sent by the network device in the second time period is located in a last but y−1 slot of the first discontinuous reception active time, y<X, and y is a positive integer.

In the foregoing embodiment, the first communications device can successfully parse the DCI in the first time period or at the end moment of the first time period.

In an example embodiment, a length of the first time period is M slots. M=minimum K0−1, or M=Z−1, or M=max(minimum K0, Z)−1, where minimum K0 represents the minimum value of the slot interval between the PDCCH and the physical downlink shared channel (PDSCH), Z represents the first constant value, and Z is a positive integer.

In the foregoing embodiment, the first communications device can successfully parse the DCI in the first time period or at the end moment of the first time period.

In an example embodiment, the first constant value Z is associated with a subcarrier spacing, a first constant value corresponding to a first subcarrier spacing is greater than or equal to a first constant value corresponding to a second subcarrier spacing, and the first subcarrier spacing is greater than the second subcarrier spacing.

In the foregoing embodiment, the first communications device can successfully parse the DCI in the first time period or at the end moment of the first time period.

According to a fourth aspect, an embodiment of this application provides a communication method, and the method includes: A network device sends first DCI to a first communications device in a first discontinuous reception active time, where the first DCI is used to indicate new uplink or downlink data transmission; and the network device starts or restarts a discontinuous reception inactivity timer at a start moment of a slot corresponding to a sum of X and a slot number of a slot in which the first DCI is located, where X is an integer greater than or equal to 0.

In the foregoing method, start time of the drx-InactivityTimer is modified, and both the network device and UE simultaneously start or restart the drx-InactivityTimer after the UE successfully parses DCI, so that a problem that the network device and the UE have inconsistent understanding of discontinuous reception active time can be avoided.

In an example embodiment, X=minimum K0, or X=Z, or X=max(minimum K0, Z), where minimum K0 represents a minimum value of the slot interval between a PDCCH and a PDSCH, and Z represents a first constant value.

In an example embodiment, the first constant value Z is associated with a subcarrier spacing, a first constant value corresponding to a first subcarrier spacing is greater than or equal to a first constant value corresponding to a second subcarrier spacing, and the first subcarrier spacing is greater than the second subcarrier spacing.

In the foregoing embodiment, the first communications device can successfully parse the DCI before the drx-InactivityTimer is started.

According to a fifth aspect, an embodiment of this application provides a communication method, and the method includes: A first communications device monitors a PDCCH in a third time period after a first discontinuous reception active time, where a start moment of the third time period is an end moment of the first discontinuous reception active time; and if the first communications device is in a second discontinuous reception active time at an end of the third time period, the first communications device continues to monitor the PDCCH after the third time period; or if the first communications device is not in the second discontinuous reception active time at the end of the third time period, the first communications device does not monitor the PDCCH after the third time period.

In the foregoing method, once a network device schedules new uplink or downlink data transmission by using the PDCCH at an end of the first discontinuous reception active time (for example, a last slot of the first discontinuous reception active time), the network device may continuously schedule UE after the first discontinuous reception active time, and the UE continues to monitor the PDCCH in the third time period after the first discontinuous reception active time. Therefore, the UE does not miss detection of any PDCCH. In this way, a problem that the network device and the UE have inconsistent understanding of whether a time period that may exist after the first discontinuous reception active time is in discontinuous reception active time is avoided; and in addition, when there is data receiving/sending, the network device can also schedule the UE as soon as possible, so that a data scheduling delay is reduced.

In an example embodiment, a length of the third time period is X−y slots. The first communications device receives at least one piece of first DCI from the network device in a second time period in the first discontinuous reception active time, where the first DCI is carried by using the PDCCH and is used to indicate new uplink or downlink data transmission, and the first communications device does not receive the first DCI from the network device in a last but X−1 slot of the first discontinuous reception active time. X is an integer, X=minimum K0, or X=Z, or X=max(minimum K0, Z), minimum K0 represents a minimum value of the slot interval between the PDCCH and a PDSCH, Z represents a first constant value, Z is a positive integer, a start moment of the second time period is a start moment of a last but X−2 slot of the first discontinuous reception active time, and an end moment of the second time period is the end moment of the first discontinuous reception active time. A first piece of first DCI received by the first communications device in the second time period is located in a last but y−1 slot of the first discontinuous reception active time, y<X, and y is a positive integer.

In the foregoing embodiment, the first communications device can successfully parse the DCI in the third time period or at an end moment of the third time period.

It should be understood that if the first communications device receives the first DCI from the network device in the last but X−1 slot of the first discontinuous reception active time, y=X, and in this case, the first communications device can successfully parse the first DCI in the first discontinuous reception active time, in other words, parsing time of the first DCI does not exceed first discontinuous reception on duration, the third time period is 0, and a problem that the network device and the first communications device have inconsistent understanding of discontinuous reception active time does not appear. If the first communications device receives the first DCI from the network device in a slot (for example, a last but X slot) before the last but X−1 slot of the first discontinuous reception active time, y>X, and in this case, the first communications device can successfully parse the first DCI in the first discontinuous reception active time, in other words, parsing time of the first DCI does not exceed first discontinuous reception on duration, the third time period does not exist, and a problem that the network device and the first communications device have inconsistent understanding of discontinuous reception active time does not appear.

In an example embodiment, a length of the third time period is M slots. M=minimum K0−1, or M=Z−1, or M=max(minimum K0, Z)−1, where minimum K0 represents the minimum value of the slot interval between the PDCCH and the PDSCH, and Z is the first constant value.

In the foregoing embodiment, the first communications device can successfully parse the DCI in the third time period or at an end moment of the third time period.

In an example embodiment, the first constant value Z is associated with a subcarrier spacing, a first constant value corresponding to a first subcarrier spacing is greater than or equal to a first constant value corresponding to a second subcarrier spacing, and the first subcarrier spacing is greater than the second subcarrier spacing.

In the foregoing embodiment, the first communications device can successfully parse the DCI in the third time period or at an end moment of the third time period.

In an example embodiment, the method further includes: The first communications device receives second DCI from the network device in the third time period, where the second DCI is carried by using the PDCCH, and the second DCI is not used to indicate new uplink or downlink data transmission.

In the foregoing embodiment, the first communications device may receive the second DCI from the network device in the third time period, and the UE does not miss detection of any PDCCH.

In an example embodiment, the second DCI is used to indicate retransmission of uplink or downlink data, or a DCI format of the second DCI is a DCI format of a non-scheduling type.

In the foregoing embodiment, a data scheduling delay of the first communications device can be reduced.

In an example embodiment, the method further includes: The first communications device receives the first DCI from the network device in a second time period in the first discontinuous reception active time, where the first DCI is carried by using the PDCCH and is used to indicate new uplink or downlink data transmission; and the first communications device receives the first DCI from the network device in the third time period, where a start moment of the second time period is a start moment of a last but X−2 slot of the first discontinuous reception active time, an end moment of the second time period is the end moment of the first discontinuous reception active time, and X=minimum K0, or X=Z, or X=max(minimum K0, Z), where minimum K0 represents the minimum value of the slot interval between the PDCCH and the PDSCH, and Z represents the first constant value.

In the foregoing embodiment, the first communications device may receive the first DCI from the network device in the third time period, and the UE does not miss detection of any PDCCH, so that a data scheduling delay of the first communications device can be reduced.

According to a sixth aspect, an embodiment of this application provides a communication method, and the method includes: A network device sends a PDCCH to a first communications device in a third time period after a first discontinuous reception active time, where a start moment of the third time period is an end moment of the first discontinuous reception active time; and if the network device is in a second discontinuous reception active time at an end of the third time period, the network device sends the PDCCH to the first communications device after the third time period; or if the network device is not in the second discontinuous reception active time at the end of the third time period, the network device does not send the PDCCH to the first communications device after the third time period.

In the foregoing method, once the network device schedules new uplink or downlink data transmission by using the PDCCH at an end of the first discontinuous reception active time (for example, a last slot of the first discontinuous reception active time), the network device may continuously schedule UE after the first discontinuous reception active time, and the UE continues to monitor the PDCCH in the third time period after the first discontinuous reception active time. Therefore, the UE does not miss detection of any PDCCH. In this way, a problem that the network device and the UE have inconsistent understanding of whether a time period that may exist after the first discontinuous reception active time is in discontinuous reception active time is avoided; and in addition, when there is data receiving/sending, the network device can also schedule the UE as soon as possible, so that a data scheduling delay is reduced.

In an example embodiment, a length of the third time period is X−y slots. The network device sends at least one piece of first DCI to the first communications device in a second time period in the first discontinuous reception active time, where the first DCI is carried by using the PDCCH and is used to indicate new uplink or downlink data transmission, and the network device does not send the first DCI to the first communications device in a last but X−1 slot of the first discontinuous reception active time. X is an integer, X=minimum K0, or X=Z, or X=max(minimum K0, Z), minimum K0 represents a minimum value of the slot interval between the PDCCH and a PDSCH, Z represents a first constant value, Z is a positive integer, a start moment of the second time period is a start moment of a last but X−2 slot of the first discontinuous reception active time, and an end moment of the second time period is the end moment of the first discontinuous reception active time. A first piece of first DCI sent by the network device in the second time period is located in a last but y−1 slot of the first discontinuous reception active time, y<X, and y is a positive integer.

In the foregoing embodiment, the first communications device can successfully parse the DCI in the third time period or at an end moment of the third time period.

In an example embodiment, a length of the third time period is M slots. M=minimum K0−1, or M=Z−1, or M=max(minimum K0, Z)−1, where minimum K0 represents a minimum value of the slot interval between the PDCCH and a PDSCH, and Z is a first constant value.

In the foregoing embodiment, the first communications device can successfully parse the DCI in the third time period or at an end moment of the third time period.

In an example embodiment, the first constant value Z is associated with a subcarrier spacing, a first constant value corresponding to a first subcarrier spacing is greater than or equal to a first constant value corresponding to a second subcarrier spacing, and the first subcarrier spacing is greater than the second subcarrier spacing.

In the foregoing embodiment, the first communications device can successfully parse the DCI in the third time period or at an end moment of the third time period.

In an example embodiment, that a network device sends a PDCCH to a first communications device in a third time period after a first discontinuous reception active time includes: The network device sends second DCI to the first communications device in the third time period, where the second DCI is carried by using the PDCCH, and the second DCI is not used to indicate new uplink or downlink data transmission.

In the foregoing embodiment, the first communications device may receive the second DCI from the network device in the third time period, and the UE does not miss detection of any PDCCH.

In an example embodiment, the second DCI is used to indicate retransmission of uplink or downlink data, or a DCI format of the second DCI is a DCI format of a non-scheduling type.

In the foregoing embodiment, a data scheduling delay of the first communications device can be reduced.

In an example embodiment, that a network device sends a PDCCH to a first communications device in a third time period after a first discontinuous reception active time includes: The network device sends the first DCI to the first communications device in a second time period in the first discontinuous reception active time, where the first DCI is carried by using the PDCCH and is used to indicate new uplink or downlink data transmission; and the network device sends the first DCI to the first communications device in the third time period, where a start moment of the second time period is a start moment of a last but X−2 slot of the first discontinuous reception active time, an end moment of the second time period is the end moment of the first discontinuous reception active time, and X=minimum K0, or X=Z, or X=max(minimum K0, Z), where minimum K0 represents the minimum value of the slot interval between the PDCCH and the PDSCH, and Z represents the first constant value.

In the foregoing embodiment, the first communications device may receive the first DCI from the network device in the third time period, and the UE does not miss detection of any PDCCH, so that a data scheduling delay of the first communications device can be reduced.

According to a seventh aspect, an embodiment of this application provides a communication method. The method includes:
  a first communications device receives first DCI from a network device in a first discontinuous reception active time, where the first DCI is used to indicate new uplink or downlink data transmission; and the first communications device starts or restarts a discontinuous reception inactivity timer at a start moment of a $(Z1+1)^{th}$ symbol after a symbol on which the first DCI is located, where Z1 is a second constant value, and Z1 is an integer greater than or equal to 1.

In the foregoing method, start time of the drx-InactivityTimer is modified, and both the network device and UE simultaneously start or restart the drx-InactivityTimer after the UE successfully parses DCI, so that a problem that the network device and the UE have inconsistent understanding of discontinuous reception active time can be avoided.

In an example embodiment, the second constant value Z1 is associated with a subcarrier spacing, a second constant value corresponding to a first subcarrier spacing is greater than or equal to a second constant value corresponding to a second subcarrier spacing, and the first subcarrier spacing is greater than the second subcarrier spacing.

In the foregoing embodiment, the first communications device can successfully parse the DCI before the drx-InactivityTimer is started.

According to an eighth aspect, an embodiment of this application provides a communication method, and the method includes: A network device sends first DCI to a first communications device in a first discontinuous reception active time, where the first DCI is used to indicate new uplink or downlink data transmission; and the network device starts or restarts a discontinuous reception inactivity timer at a start moment of a $(Z1+1)^{th}$ symbol after a symbol on which the first DCI is located, where Z1 is a second constant value, and Z1 is an integer greater than or equal to 1.

In the foregoing method, start time of the drx-InactivityTimer is modified, and both the network device and UE simultaneously start or restart the drx-InactivityTimer after the UE successfully parses DCI, so that a problem that the network device and the UE have inconsistent understanding of discontinuous reception active time can be avoided.

In an example embodiment, the second constant value Z1 is associated with a subcarrier spacing, a second constant value corresponding to a first subcarrier spacing is greater than or equal to a second constant value corresponding to a second subcarrier spacing, and the first subcarrier spacing is greater than the second subcarrier spacing.

In the foregoing embodiment, the first communications device can successfully parse the DCI before the drx-InactivityTimer is started.

According to a ninth aspect, an embodiment of this application provides a communications apparatus, for example, a first communications apparatus. The apparatus may be a terminal device, or may be a chip in the terminal device. The apparatus may include a processing unit, a sending unit, and a receiving unit. It should be understood that the sending unit and the receiving unit herein may alternatively be a transceiver unit. When the apparatus is a terminal device, the processing unit may be a processor, and the sending unit and the receiving unit may be a transceiver. The terminal device may further include a storage unit, and the storage unit may be a memory. The storage unit is configured to store instructions, and the processing unit executes the instructions stored in the storage unit, so that the terminal device is enabled to perform the method in the first aspect or any embodiment of the first aspect, the method in the second aspect or any embodiment of the second aspect, the method in the fifth aspect or any embodiment of the fifth aspect, or the method in the seventh aspect or any embodiment of the seventh aspect. When the apparatus is a chip in a terminal device, the processing unit may be a processor, and the sending unit and the receiving unit may be input/output interfaces, pins, circuits, or the like. The processing unit executes instructions stored in a storage unit, so that the chip is enabled to perform the method in the first aspect or any embodiment of the first aspect, the method in the second aspect or any embodiment of the second aspect, the method in the fifth aspect or any embodiment of the fifth aspect, or the method in the seventh aspect or any embodiment of the seventh aspect. The storage unit is configured to store instructions. The storage unit may be a storage unit (for example, a register or a cache) in the chip, or may be a storage unit (for example, a read-only memory or a random access memory) that is in the terminal device and that is located outside the chip.

According to a tenth aspect, an embodiment of this application provides a communications apparatus. The apparatus may be a network device, or may be a chip in the network device. The apparatus may include a processing unit, a sending unit, and a receiving unit. It should be understood that the sending unit and the receiving unit herein may alternatively be a transceiver unit. When the apparatus is a network device, the processing unit may be a processor, and the sending unit and the receiving unit may be a transceiver. The terminal device may further include a storage unit, and the storage unit may be a memory. The storage unit is configured to store instructions, and the processing unit executes the instructions stored in the storage unit, so that the network device is enabled to perform the method in the third aspect or any embodiment of the third aspect, the method in the fourth aspect or any embodiment of the fourth aspect, the method in the sixth aspect or any embodiment of the sixth aspect, or the method in the eighth aspect or any embodiment of the eighth aspect. When the apparatus is a chip in a network device, the processing unit may be a processor, and the sending unit and the receiving unit may be input/output interfaces, pins, circuits, or the like. The processing unit executes instructions stored in a storage unit, so that the chip is enabled to perform the method in the third aspect or any embodiment of the third aspect, the method in the fourth aspect or any embodiment of the fourth aspect, the method in the sixth aspect or any embodiment of the sixth aspect, or the method in the eighth aspect or any embodiment of the eighth aspect. The storage unit is configured to store instructions. The storage unit may be a storage unit (for example, a register or a cache) in the chip, or may be a storage unit (for example, a read-only memory or a random access memory) that is in the network device and that is located outside the chip.

According to an eleventh aspect, an embodiment of this application further provides a computer-readable storage medium. The computer-readable storage medium stores a computer program. When the computer program is run on a computer, the computer is enabled to perform the method according to the first aspect to the eighth aspect.

According to a twelfth aspect, an embodiment of this application further provides a computer program product including a program, and when the computer program product runs on a computer, the computer is enabled to perform the methods in the first aspect to the eighth aspect.

DESCRIPTION OF EMBODIMENTS

The following describes the embodiments of this application with reference to accompanying drawings.

First, existing technologies involved in the embodiments of this application are briefly described.

In NR Rel-15, when a network device sends DCI on a PDCCH to schedule UE to receive downlink data or uplink data, the DCI may indicate a transmission parameter of a PDSCH (corresponding to the downlink data) or a PUSCH (corresponding to the uplink data). The transmission parameter is used to determine a time domain resource location of the PDSCH or the PUSCH. Specifically, the time domain resource location of the PDSCH includes a slot in which the PDSCH is located and a start location and a length that are of a symbol occupied by the PDSCH in the slot, and the time domain resource location of the PUSCH includes a slot in which the PUSCH is located and a start location and a length that are of a symbol occupied by the PUSCH in the slot.

A slot interval between the PDCCH and the PDSCH is represented by K0, and a slot interval between the PDCCH and the PUSCH is represented by K2. The network device configures an available value set of K0 and an available value set of K2 for the UE by using RRC signaling, for example, configures a time-domain resource allocation (TDRA) table, where the table includes a plurality of K0 and a plurality of K2; and then a value in the available value set in the TDRA table is indicated by using DCI, and is used for current data scheduling. A case in which the PDCCH and the PDSCH (or the PUSCH) are in a same slot is referred to as same-slot scheduling (corresponding to a case in which K0=0 or K2=0), and a case in which the PDCCH and PDSCH (or the PUSCH) are in different slots is referred to as cross-slot scheduling (corresponding to a case in which K0>0 or K2>0).

However, before the UE parses the DCI, the UE does not know a value of K0 or K2 indicated by the DCI. Downlink scheduling is used as an example. If the available value set of K0 configured by the network device for the UE includes both a case in which K0=0 and a case in which K0>0, before parsing the DCI, the UE does not know whether current scheduling is same-slot scheduling or cross-slot scheduling. The UE knows, only after the UE successfully parses the DCI and obtains K0, a slot in which a currently scheduled PDSCH is located.

Figure 1:
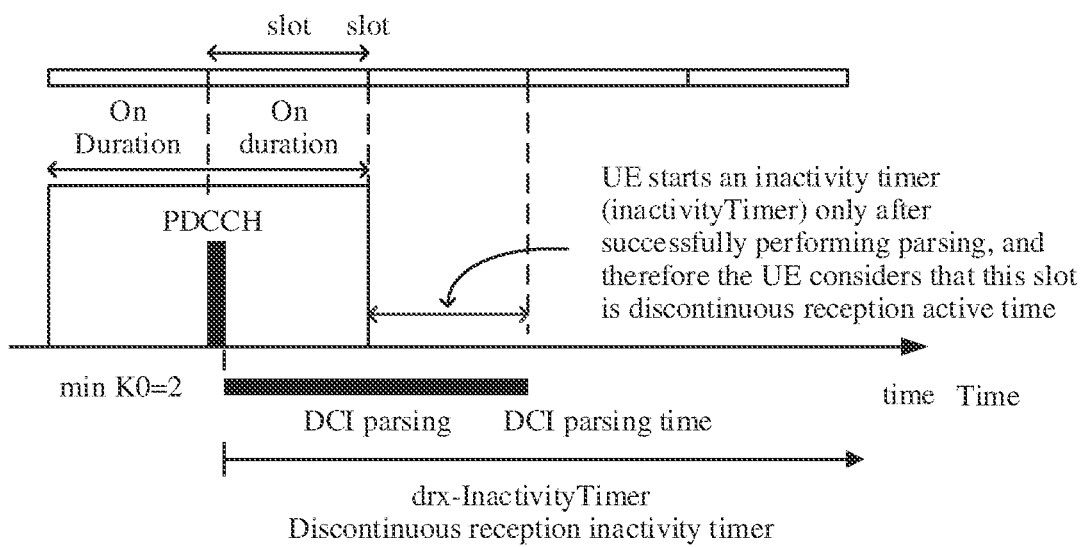
FIG. 1 is a schematic diagram of scheduling of new downlink data transmission in discontinuous reception on duration according to an embodiment of this application.
Figure 2:
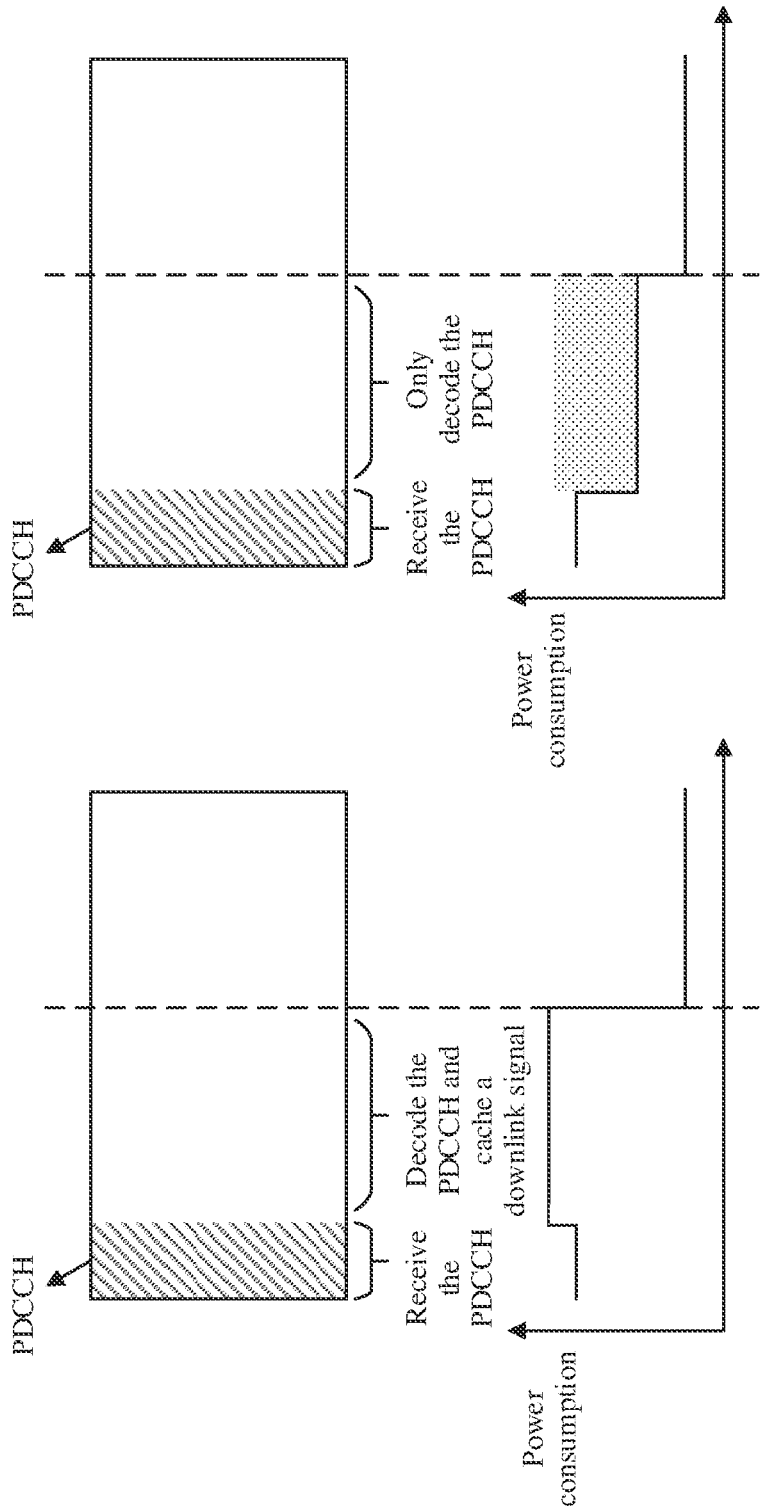
FIG. 2 is a schematic diagram of UE power consumption of PDSCH scheduling by a PDCCH in different scenarios according to an embodiment of this application.

Therefore, the foregoing scheduling manner in the NR Rel-15 is not conducive to energy saving of the UE, and this may be specifically embodied in the following two aspects:

In one aspect, downlink scheduling is used as an example. As shown on a left side of FIG. 2, if the UE does not know whether same-slot scheduling is performed in a current slot (for example, same-slot scheduling may exist provided that the TDRA table configured by the network device includes K0=0), to avoid a loss of signal, after receiving the DCI, the UE needs to cache a downlink signal when parsing the DCI, and if current data scheduling is cross-slot scheduling, the signal that is cached in advance by the UE is unnecessary, and this causes waste of power consumption. As shown on a right side of FIG. 2, if the UE can know in advance that the current data scheduling is cross-slot scheduling, after receiving the DCI, when parsing the DCI, the UE may disable a radio frequency module and does not cache any signal, so that energy can be saved (as shown on the right side of FIG. 2, a shaded part in a lower right corner is saved energy).

Figure 3:
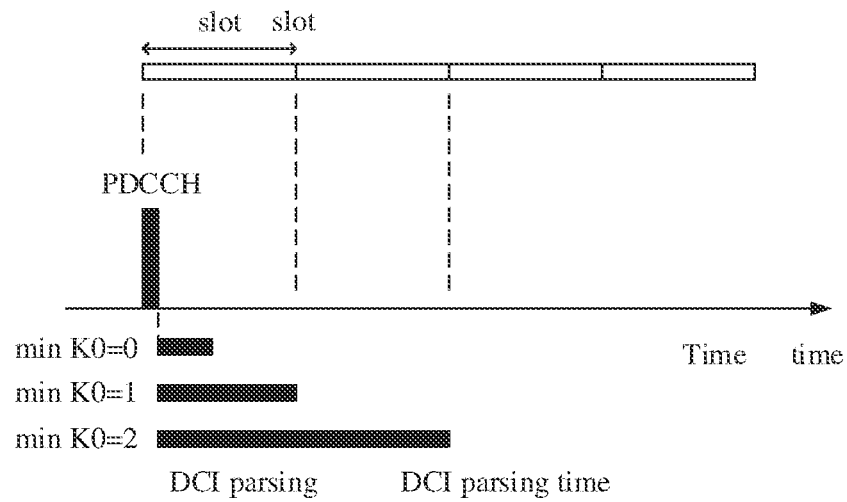
FIG. 3 is a schematic diagram of DCI parsing time according to an embodiment of this application.

In another aspect, a speed at which the UE parses the DCI also affects power consumption of the UE. If the UE parses the DCI at a relatively fast speed, the UE needs to work at a relatively high clock frequency and a relatively high voltage, and therefore power consumption is relatively high. However, if the UE knows in advance that there is a minimum slot interval between the PDCCH and the PDSCH (or the PUSCH), the UE can reduce a parsing speed of the DCI, to reduce the working clock frequency and the working voltage, thereby reducing power consumption. For example, if the network device has notified the UE of a minimum value in current available values with respect to a value of "K0", in other words, if a network configures a value of minimum K0 by using RRC signaling or dynamically indicates a value of minimum K0 by using L1 signaling, the UE may reduce the parsing speed of the DCI, as shown in FIG. 3. For example, if minimum K0 is greater than or equal to 1, DCI parsing time may be prolonged to an end of a slot in which (n+minimum K0−1) is located, where n is a serial number of a slot in which the DCI is located.

It can be learned from the foregoing descriptions that, minimum values in current available values of "K0 and K2", namely, minimum K0 and minimum K2, are set, so that the UE can learn, before parsing the DCI, whether current scheduling is same-slot scheduling or cross-slot scheduling. If it is determined that the current scheduling is cross-slot scheduling, before successfully parsing the DCI, the UE may not cache any signal and enter micro-sleep (for example, disabling receiving RF), to reduce power consumption. In addition, the UE may reduce the parsing speed of the DCI, to reduce the clock frequency and the working voltage to reduce power consumption.

In an RRC connected mode, the UE may be configured with discontinuous reception (connected-discontinuous reception, C-DRX), so that a terminal device enters discontinuous reception on duration (DRX ON Duration) at intervals of a specific cycle to send or receive data, and may enter a sleep state at other time without listening on a PDCCH, to reduce power consumption of the UE. A status of UE that is configured with DRX may be divided into a discontinuous reception active (DRX Active) state and a discontinuous reception non-active (DRX non-active) state, and time in which the UE is in the DRX Active state is referred to as discontinuous reception active time (DRX Active Time). When the UE is in the DRX Active Time, the UE continuously monitors the PDCCH. If the UE exits the DRX Active state, that is, enters a sleep state (DRX non-active), the UE does not monitor the PDCCH. When any one of the following timers is running, the UE is in the DRX Active Time. These timers include a discontinuous reception on duration timer (drx-onDurationTimer), a discontinuous reception inactivity timer (drx-InactivityTimer), a discontinuous reception downlink retransmission timer (drx-RetransmissionTimerDL), a discontinuous reception uplink retransmission timer (drx-RetransmissionTimerUL), and a random access contention resolution timer (ra-ContentionResolutionTimer). In addition, the DRX active time further includes another case, for example, a waiting period after the UE sends a scheduling request (SR) on a PUCCH, and a period that is after the UE successfully receives a random access response (RAR) for non-contention-based random access and in which the UE has not received a PDCCH indicating new uplink or downlink data transmission.

It should be understood that, when the UE is in the DRX Active Time, the UE continuously monitors the PDCCH. If the UE exits the DRX Active time, the UE does not monitor the PDCCH. Specifically, cyclic redundancy check (CRC) of the PDCCH herein may be scrambled by using the following radio network temporary identifier (RNTI): a cell radio network temporary identifier (cell RNTI, C-RNTI), a configured scheduling radio network temporary identifier (Configured Scheduling RNTI, CS-RNTI), an interruption radio network temporary identifier (Interruption RNTI, INT-RNTI), a slot format indication radio network temporary identifier (Slot Format Indication RNTI, SFI-RNTI), a semi-persistent channel state information radio network temporary identifier (Semi-Persistent CSI RNTI, SP-CSI-RNTI), a transmit power control PUCCH radio network temporary identifier (transmit power control-PUCCH-RNTI, TPC-PUCCH-RNTI), a transmit power control PUSCH radio network temporary identifier (transmit power control-PUSCH-RNTI, TPC-PUSCH-RNTI), or a transmit power control SRS radio network temporary identifier (transmit power control-SRS-RNTI, TPC-SRS-RNTI).

Figure 4:
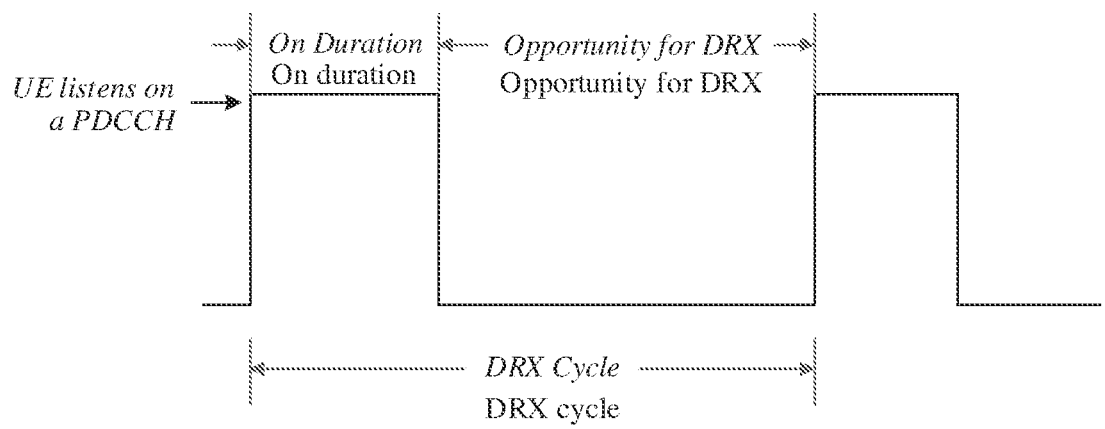
FIG. 4 is a schematic diagram of a DRX cycle according to an embodiment of this application.
Figure 5:
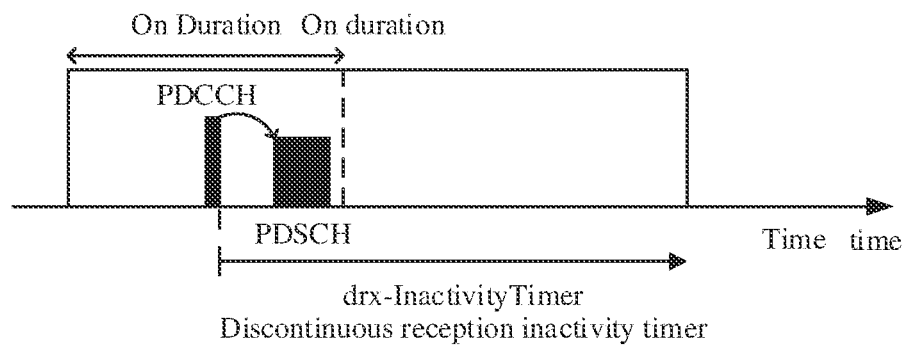
FIG. 5 is a schematic diagram of a start moment of a discontinuous reception inactivity timer in an existing technology according to an embodiment of this application.

FIG. 4 shows an example of a UE status after a DRX cycle is configured. At a start moment of a C-DRX cycle, the UE first enters DRX ON Duration, and starts a drx-onDurationTimer at the same time. If the UE receives, in the DRX ON Duration, a PDCCH used to indicate new downlink or uplink data transmission, the UE starts a drx-InactivityTimer. The UE keeps in the DRX-Active state until the drx-InactivityTimer expires, or the UE stops the drx-InactivityTimer early when receiving related control unit (MAC CE) signaling. In an existing technology, the drx-InactivityTimer is started or restarted on a first symbol after a symbol on which a PDCCH indicating new uplink or downlink data transmission is located. As shown in FIG. 5, the PDCCH schedules new PDSCH transmission.

This application is mainly applied to a fifth-generation wireless communications (new radio, NR) system, and may also be applied to another communications system, for example, a narrowband internet of things (NB-IoT) system, a machine type communication (MTC) system, or a future next-generation communications system.

Figure 6:
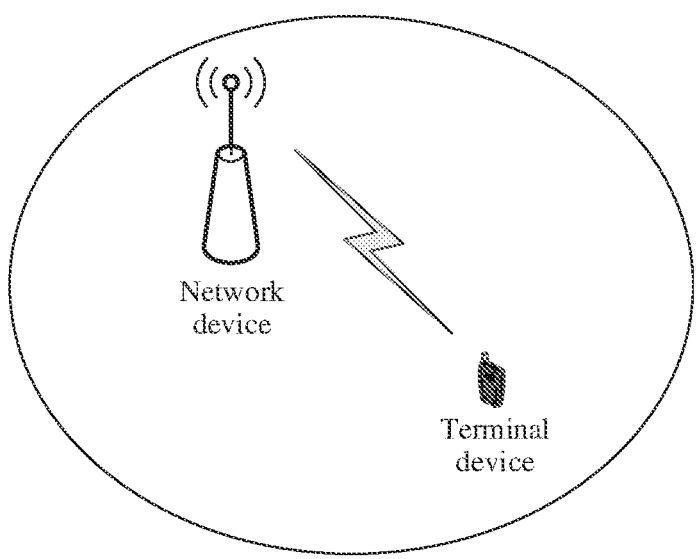
FIG. 6 is a schematic architectural diagram of a communications system according to an embodiment of this application.

Network elements in the embodiments of this application include a terminal device and a network device. As shown in FIG. 6, a communications system includes a network device and a terminal device. In the communications system, the network device sends information to the terminal device through a downlink channel, and the terminal device sends information to the network device through an uplink channel. The terminal device may be a mobile phone, a tablet computer, a computer with wireless sending and receiving functions, an Internet of Things terminal device, or the like. The terminal device may also be referred to as a mobile station, a mobile, a remote station, a remote terminal, an access terminal, or a user agent. The terminal device may alternatively be an automobile in vehicle-to-vehicle (V2V) communication, a machine in machine type communication, or the like. This is not limited herein. The network device may be base stations in various forms, for example, a macro base station, a micro base station (which may also be referred to as a small cell), a relay station, an access point, an evolved NodeB (eNodeB), a wireless fidelity access point (Wi-Fi AP), a worldwide interoperability for microwave access base station (WiMAX BS), or the like. This is not limited herein. In addition, in a system that uses different radio access technologies, a name of a network device with a radio access function may be different. For example, in an LTE system, the network device is referred to as an evolved NodeB (evolved NodeB, eNB or eNodeB); in a 3rd generation (3G) system, the network device is referred to as a NodeB (Node B); and in an NR system, the network device is referred to as a gNB.

The foregoing network elements may be network elements implemented on dedicated hardware, software instances running on the dedicated hardware, or instances of virtualization functions on an appropriate platform. In addition, the embodiments of this application are further applicable to another future-oriented communications technology. The network architecture and the service scenario described in this application are intended to describe the technical solutions in this application more clearly, and do not constitute a limitation on the technical solutions provided in this application. A person of ordinary skill in the art may know that: With the evolution of the network architecture and the emergence of new service scenarios, the technical solutions provided in this application are also applicable to similar technical problems.

In the embodiments of this application, a first communications device may be a terminal device or a chip system in the terminal device.

Figure 7:
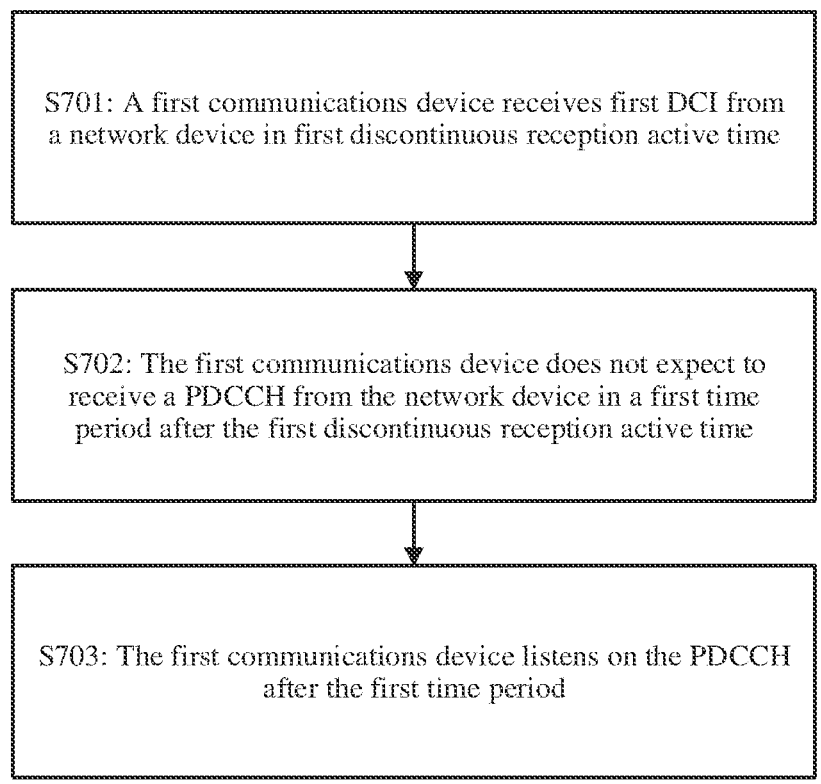
FIG. 7 is an overview flowchart 1 of a communication method according to an embodiment of this application.

Based on this, as shown in FIG. 7, an embodiment of this application provides a communication method, and the method includes the following steps.

S701: A first communications device receives first DCI from a network device in a first discontinuous reception active time, where the first DCI is used to indicate new uplink or downlink data transmission.

Accordingly, the network device sends the first DCI to the first communications device in the first discontinuous reception active time. The network device starts a discontinuous reception inactivity timer on a first symbol after a symbol occupied by the first DCI sent to the first communications device.

S702: The first communications device does not expect to receive a PDCCH from the network device in a first time period after the first discontinuous reception active time, where a start moment of the first time period is an end moment of the first discontinuous reception active time, and an end moment of the first time period is in a second discontinuous reception active time.

Accordingly, the network device does not send the PDCCH to the first communications device in the first time period after the first discontinuous reception active time.

S703: The first communications device monitors the PDCCH after the first time period.

Accordingly, the network device may send the PDCCH to the first communications device after the first time period.

It should be understood that, that the network device sends the PDCCH means that the network device sends DCI on the PDCCH, such as the first DCI or another type of DCI. That the first communications device receives the PDCCH means blind detection on the PDCCH, or listening on the PDCCH, or receiving downlink control information on the PDCCH, or blind detection of downlink control information on the PDCCH. That the first communications device does not expect to receive the PDCCH from the network device means that the first communications device does not expect DCI to exist on the PDCCH, or assumes that the network device does not send DCI on the PDCCH.

It should be understood that the first communications device does not expect to receive the PDCCH from the network device in the first time period after the first discontinuous reception active time, and the PDCCH is a PDCCH sent by the network device only in the DRX active time. For example, the first communications device does not expect to receive DCI obtained after CRC of the first communications device is scrambled by using the following RNTI: a C-RNTI, a CS-RNTI, an INT-RNTI, an SFI-RNTI, an SP-CSI-RNTI, a TPC-PUCCH-RNTI, a TPCPUSCH-RNTI, or a TPC-SRS-RNTI.

In this embodiment, a symbol occupied by the first DCI (or a symbol on which a PDCCH used to indicate new uplink or downlink data transmission is located) is in the first discontinuous reception active time. The first discontinuous reception active time may be running time of any one of the following timers: drx-onDurationTimer, drx-InactivityTimer, drx-RetransmissionTimerDL, drx-RetransmissionTimerUL, and ra-ContentionResolutionTimer. In addition, the first discontinuous reception active time further includes another case, for example, a waiting period after the first communications device sends an SR on a PUCCH, or a period that is after the first communications device successfully receives a RAR for non-contention-based random access and in which the first communications device has not received the PDCCH indicating new uplink or downlink data transmission. A first symbol after the symbol occupied by the first DCI (or the symbol on which the PDCCH used to indicate new uplink or downlink data transmission is located) is a start moment of the second discontinuous reception active time. The second discontinuous reception active time is a time period in which the drx-InactivityTimer is running.

It should be understood that, starting from the first symbol after the symbol occupied by the first DCI (or the symbol on which the PDCCH used to indicate new uplink or downlink data transmission is located), a drx-InactivityTimer corresponding to the second discontinuous reception active time starts to perform timing (in other words, is started or restarted). In this case, timing of a timer corresponding to the first discontinuous reception active time has not ended, but discontinuous reception active time is updated. Therefore, a moment at which the drx-InactivityTimer is started or restarted is defined as the start moment of the second discontinuous reception active time herein. It should be noted that the end moment of the first discontinuous reception active time is still a moment at which natural timing of the timer corresponding to the first discontinuous reception active time ends. For example, if the timer corresponding to the first discontinuous reception active time is drx-onDurationTimer, the end moment of the first discontinuous reception active time is a moment at which timing of the drx-onDurationTimer ends (in other words, expires). If the network device sends the first DCI in a timing period (namely, On Duration) of the drx-onDurationTimer, the network device starts the drx-InactivityTimer on the first symbol after the first DCI, so that the discontinuous reception active time is updated, and the second discontinuous reception active time starts. The end moment of the first discontinuous reception active time is after the start moment of the second discontinuous reception active time. For another example, if the timer corresponding to the first discontinuous reception active time is drx-InactivityTimer, the drx-InactivityTimer is currently running, and if the network device sends the first DCI in a timing period of the drx-InactivityTimer, the network device restarts the drx-InactivityTimer on the first symbol after the first DCI, so that the discontinuous reception active time is updated, and the second discontinuous reception active time starts. The end moment of the first discontinuous reception active time is a moment at which natural timing expires before the drx-InactivityTimer is restarted, and is after the start moment of the second discontinuous reception active time.

In an example embodiment, the first communications device receives at least one piece of first DCI from the network device in a second time period in the first discontinuous reception active time, and the first communications device does not receive the first DCI from the network device in a last but X−1 slot of the first discontinuous reception active time. A start moment of the second time period is a start moment of a last but X−2 slot of the first discontinuous reception active time, and an end moment of the second time period is the end moment of the first discontinuous reception active time. Further, if a first piece of first DCI received by the first communications device in the second time period is located in a last but y−1 slot of the first discontinuous reception active time, y<X, and y is a positive integer, a length of the first time period is X−y slots.

It should be understood that if the first communications device receives the first DCI from the network device in the last but X−1 slot of the first discontinuous reception active time, y=X, and in this case, the first communications device can successfully parse the first DCI in the first discontinuous reception active time, in other words, parsing time of the first DCI does not exceed first discontinuous reception on duration, the first time period is 0, and a problem that the network device and the first communications device have inconsistent understanding of the discontinuous reception active time does not appear. If the first communications device receives the first DCI from the network device in a slot (for example, a last but X slot) before the last but X−1 slot of the first discontinuous reception active time, y>X, and in this case, the first communications device can successfully parse the first DCI in the first discontinuous reception active time, in other words, parsing time of the first DCI does not exceed first discontinuous reception on duration, the first time period does not exist, and a problem that the network device and the first communications device have inconsistent understanding of the discontinuous reception active time does not appear.

Three possible value manners of X are described in detail below. X=minimum K0, or X=Z, or X=max(minimum K0, Z), where minimum K0 represents a minimum value of the slot interval between the PDCCH and a PDSCH, and Z represents a first constant value.

Manner 1: X=minimum K0, where minimum K0 is a minimum value of K0 that currently takes effect, and indicates that a slot interval between a PDSCH scheduled by the PDCCH and the PDCCH is greater than or equal to minimum K0.

For example, if first DCI transmitted on the PDCCH is located in slot n, a PDSCH scheduled by the first DCI is in a slot n+minimum K0 or a slot after n+minimum K0, and the UE does not expect to receive, before the slot n+minimum K0, the PDSCH scheduled by the first DCI. Therefore, the UE may prolong parsing time of the first DCI to a slot corresponding to n+minimum K0−1. If the time used by the UE to parse the first DCI exceeds the first discontinuous reception active time of the UE, the UE does not monitor the PDCCH in a time period that exceeds the first discontinuous reception active time but in which the first DCI is still being parsed. When the UE successfully parses the first DCI, and the UE learns, by parsing the first DCI, that the first DCI indicates new downlink data transmission, the UE starts or restarts the drx-InactivityTimer. After starting the drx-InactivityTimer, the UE returns to the discontinuous reception active time. In this case, the UE enters the second discontinuous reception active time, and the UE resumes listening on the PDCCH. It should be noted that although the network device starts the drx-InactivityTimer on a first symbol after a symbol on which the PDCCH carrying the first DCI is located, because specific time is required by the UE to parse the DCI, a timing value of the UE when starting the drx-InactivityTimer needs to start from the first symbol after the symbol on which the PDCCH carrying the first DCI is located, and the second discontinuous reception active time starts from a moment at which the network device starts the drx-InactivityTimer; in other words, the first symbol after the symbol on which the PDCCH carrying the first DCI is located is defined as the start moment of the second discontinuous reception active time. For example, considering that the timer performs counting down, an initial value of the drx-InactivityTimer is T, and the time used by the UE to parse the first DCI is delta, a timing value of the UE when completing parsing of the first DCI and starting the drx-InactivityTimer is T-delta, to align timing values of timers of the UE and the network device. It should be understood that the UE may learn that the time used by the UE to parse the first DCI is delta.

Figure 8:
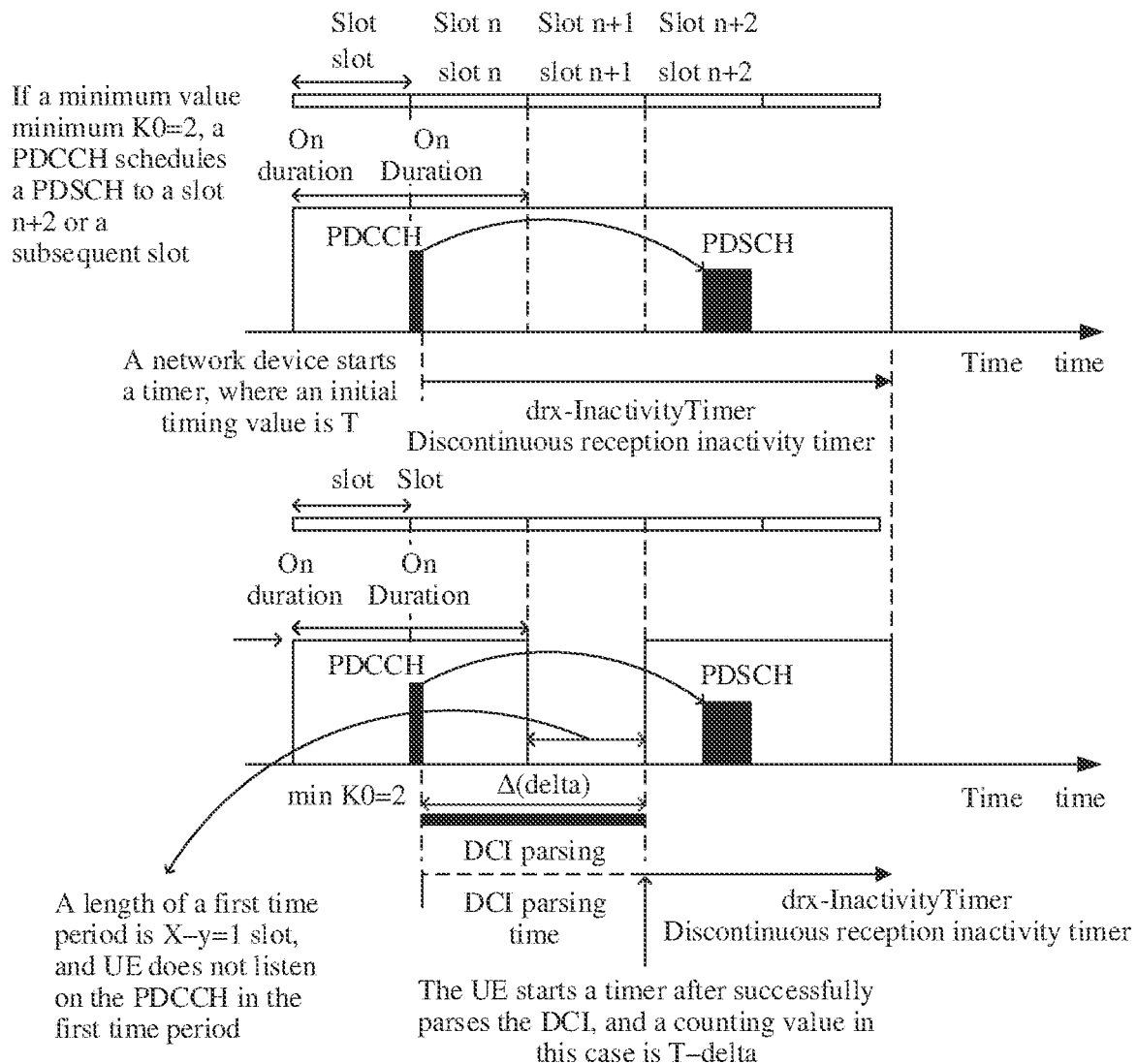
FIG. 8 is a schematic diagram 1 of a first time period according to an embodiment of this application.

For example, as shown in FIG. 8, if X=minimum K0=2, DRX on duration (namely, the first discontinuous reception active time) is two slots, the network device schedules new downlink data transmission in a last slot of the DRX on duration by using the PDCCH, and y=1, the network device starts the drx-InactivityTimer on the first symbol after the symbol on which the PDCCH is located, and the network device updates the DRX active time; in other words, a running time period of the drx-InactivityTimer is the second discontinuous reception active time. The length of the first time period is X−y=1 slot, and a start location of the first time period is an end location of the DRX on duration. The network device does not send the PDCCH in the first time period, and may send the PDCCH after the first time period.

The UE does not monitor the PDCCH in the first time period. Because minimum K0=2, the UE determines that the PDSCH scheduled by the PDCCH does not appear in a slot before the slot n+minimum K0, and therefore the UE may reduce a DCI parsing speed, so that the DCI parsing time may be prolonged to the slot n+minimum K0−1 (a first slot after the on duration in FIG. 8). Herein, the UE prolongs the DCI parsing time to an end of the slot n+minimum K0−1, that is, an end location of the first time period. After successfully parsing the DCI, the UE starts the drx-InactivityTimer, and the UE resumes listening on the PDCCH.

Figure 9:
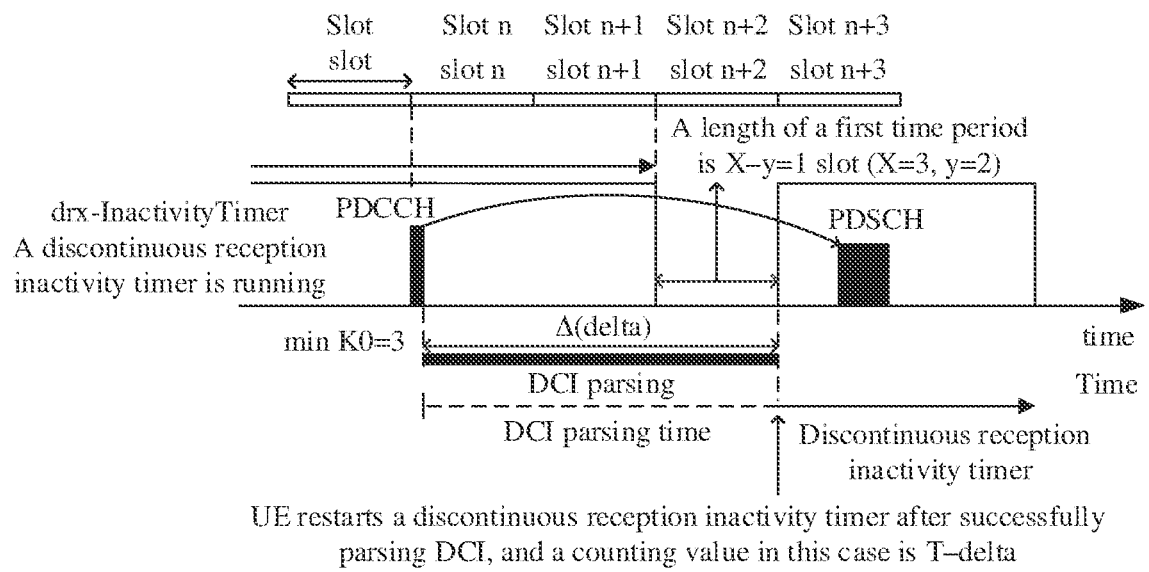
FIG. 9 is a schematic diagram 2 of a first time period according to an embodiment of this application.

For another example, as shown in FIG. 9, if X=minimum K0=3, when a first drx-InactivityTimer (namely, the first discontinuous reception active time) is running (for ease of description, the drx-InactivityTimer is referred to as the first drx-InactivityTimer before being restarted herein), the network device schedules new downlink data PDSCH in a last but one slot of the first drx-InactivityTimer by using the PDCCH, and y=2. In this case, the network device restarts the drx-InactivityTimer on the first symbol after the symbol on which the PDCCH is located, and the network device updates the DRX active time; in other words, a running time period after the drx-InactivityTimer is restarted is the second discontinuous reception active time. The length of the first time period is X−y=1 slot, and a start location of the first time period is a location at which natural timing ends before the drx-InactivityTimer is restarted, that is, a location at which natural timing of the first drx-InactivityTimer ends. The UE does not monitor the PDCCH in the first time period. Because minimum K0=3, the UE may prolong DCI parsing time to the slot n+minimum K0−1, namely, a slot n+2, for example, to an end location of the slot n+2, that is, an end location of the first time period. After successfully parsing the DCI, the UE restarts the drx-InactivityTimer, and the UE resumes listening on the PDCCH.

Figure 10:
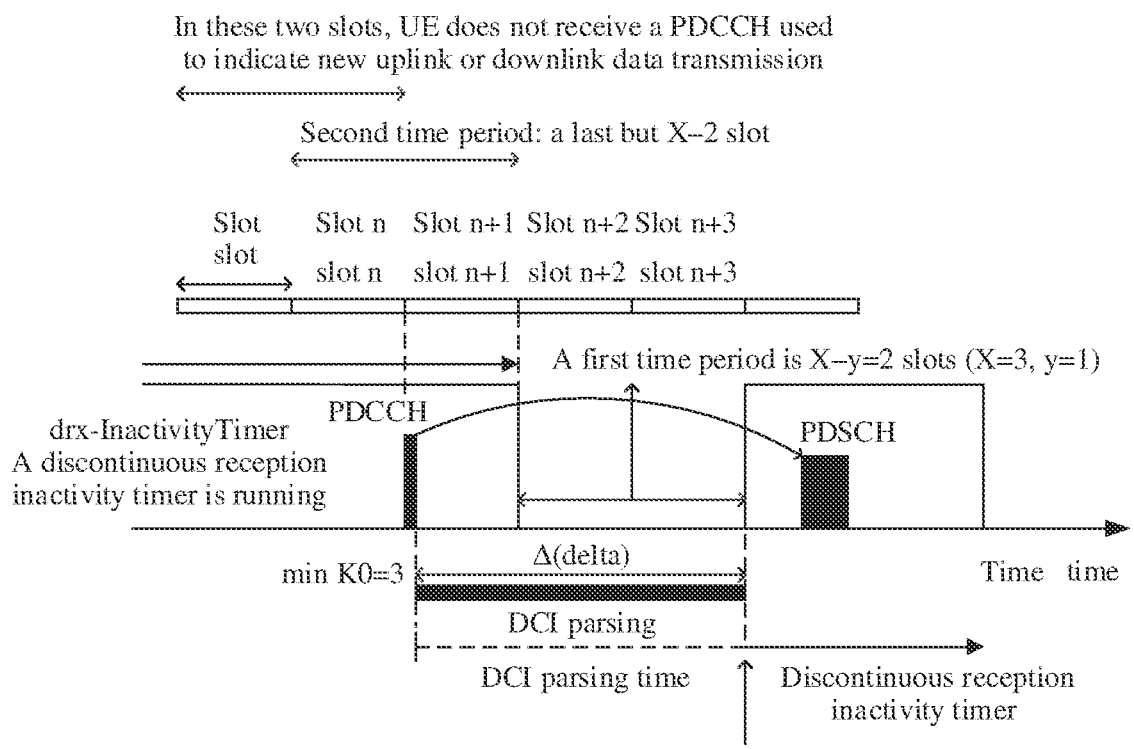
FIG. 10 is a schematic diagram 3 of a first time period according to an embodiment of this application.

Similar to FIG. 9, as shown in FIG. 10, if X=minimum K0=3, when a first drx-InactivityTimer (namely, the first discontinuous reception active time) is running, the network device schedules new downlink data transmission in a last slot of the first drx-InactivityTimer by using the PDCCH, y=1, and the length of the first time period is X−y=3−1=2 slots. The UE does not monitor the PDCCH in the first time period.

It should be understood that, for FIG. 8 to FIG. 10, the time used by the UE to parse the DCI lasts to an end location of a slot n+minimum K0−1. The UE considers that the first time period is not discontinuous reception active time because the UE has not started or restarted the drx-InactivityTimer in the first time period. However, the time used by the UE to parse the DCI depends on implementation of the UE. Therefore, the time used by the UE to parse the DCI may not last to an end of the slot n+minimum K0−1, but the UE may successfully parse the DCI at any location before the end of the slot n+minimum K0−1. Therefore, the time used by the UE to parse the DCI is not limited in this embodiment, and the UE is not limited to start or restart the drx-InactivityTimer at the end of the slot n+minimum K0−1 provided that the UE successfully parses the DCI and the UE can learn whether the DCI indicates new uplink or downlink data transmission. If yes, the UE starts or restarts the drx-InactivityTimer. Otherwise, the UE enters a DRX nonactive state. In addition, regardless of a moment at which the UE starts or restarts the drx-InactivityTimer, a timing value of the timer needs to start from a first symbol after a symbol on which the PDCCH used to indicate new uplink or downlink data transmission is located.

It should be noted that because the network device does not know when the UE successfully parses the DCI, even if the UE performs parsing at a relatively fast speed and successfully parses the DCI before the first time period ends, the network device does not know that the UE successfully parses the DCI. To avoid a problem that the network device and the UE have inconsistent understanding of whether the first time period is in the discontinuous reception active time, regardless of when the UE successfully parses the DCI, the UE does not expect to receive the PDCCH in the first time period, and accordingly, the network device does not send the PDCCH in the first time period.

Figure 11:
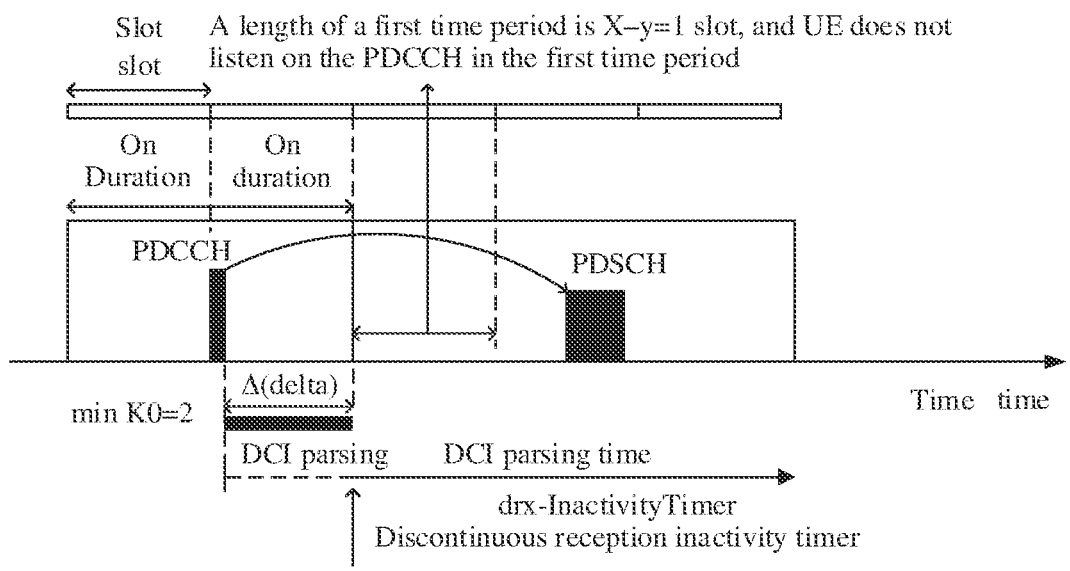
FIG. 11 is a schematic diagram 4 of a first time period according to an embodiment of this application.

For example, as shown in FIG. 11, if X=minimum K0=2, but the time used by the UE to parse the DCI does not last to a slot n+1, and the UE successfully parses the DCI at an end of the slot in which the PDCCH is located, the UE starts the drx-InactivityTimer. Since then, the UE is in the DRX active time, and the first time period is also in the DRX active time, but the UE does not monitor the PDCCH in the first time period. The network device does not send the PDCCH in the first time period. After the first time period, the UE resumes normal listening on the PDCCH, and the network device may also send the PDCCH.

Figure 12:
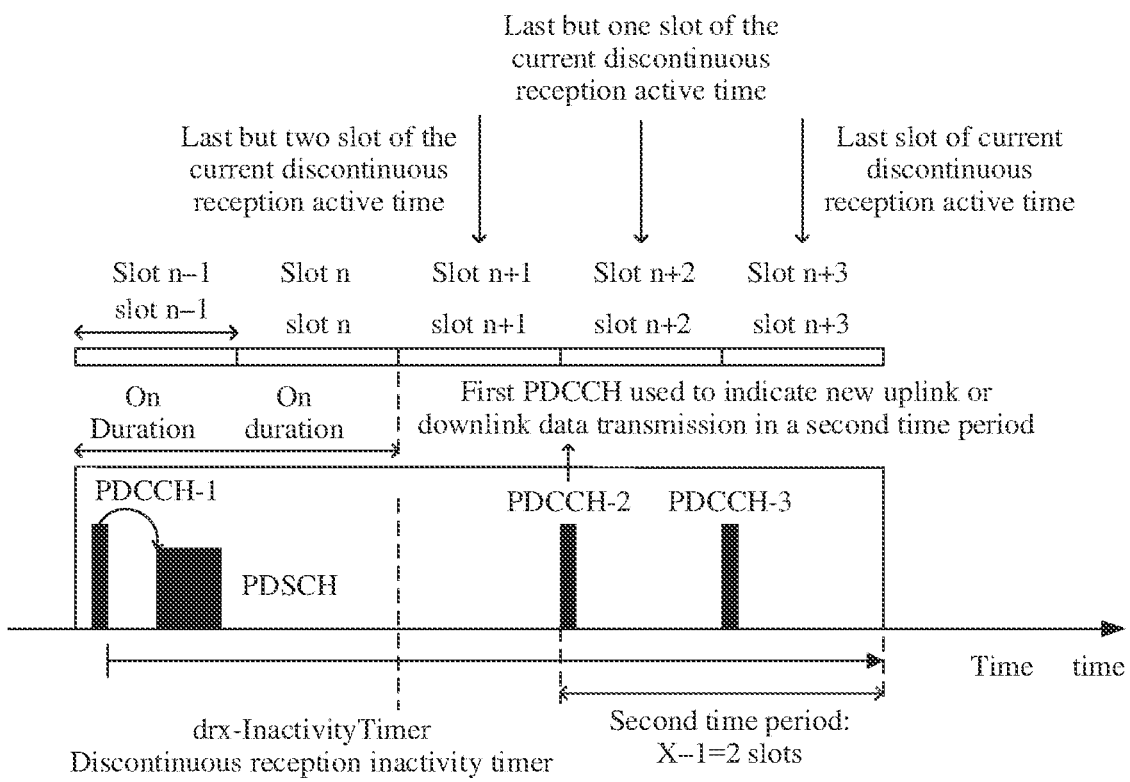
FIG. 12 is a schematic diagram of a second time period according to an embodiment of this application.

The embodiment shown in FIG. 7 is described in detail below with reference to specific examples. It should be understood that the following examples are merely examples, and are not intended to limit this application Example 1: As shown in FIG. 12, a PDCCH-1, a PDCCH-2, and a PDCCH-3 are all used to indicate new data transmission. The network device starts the drx-InactivityTimer on a first symbol that is in On Duration and that is after a symbol on which the PDCCH-1 is located, and the first discontinuous reception active time is a time period in which the drx-InactivityTimer is running from the first symbol after the symbol on which the PDCCH-1 is located. If X=3, a slot in which the PDCCH-2 is located is a first PDCCH that indicates new data transmission in a running time period of the drx-InactivityTimer, and the slot in which the PDCCH-2 is located is a last but one slot of the running time period of the drx-InactivityTimer; in other words, y=2. Therefore, the first time period is a slot after the running time period of the drx-InactivityTimer.

Figure 13:
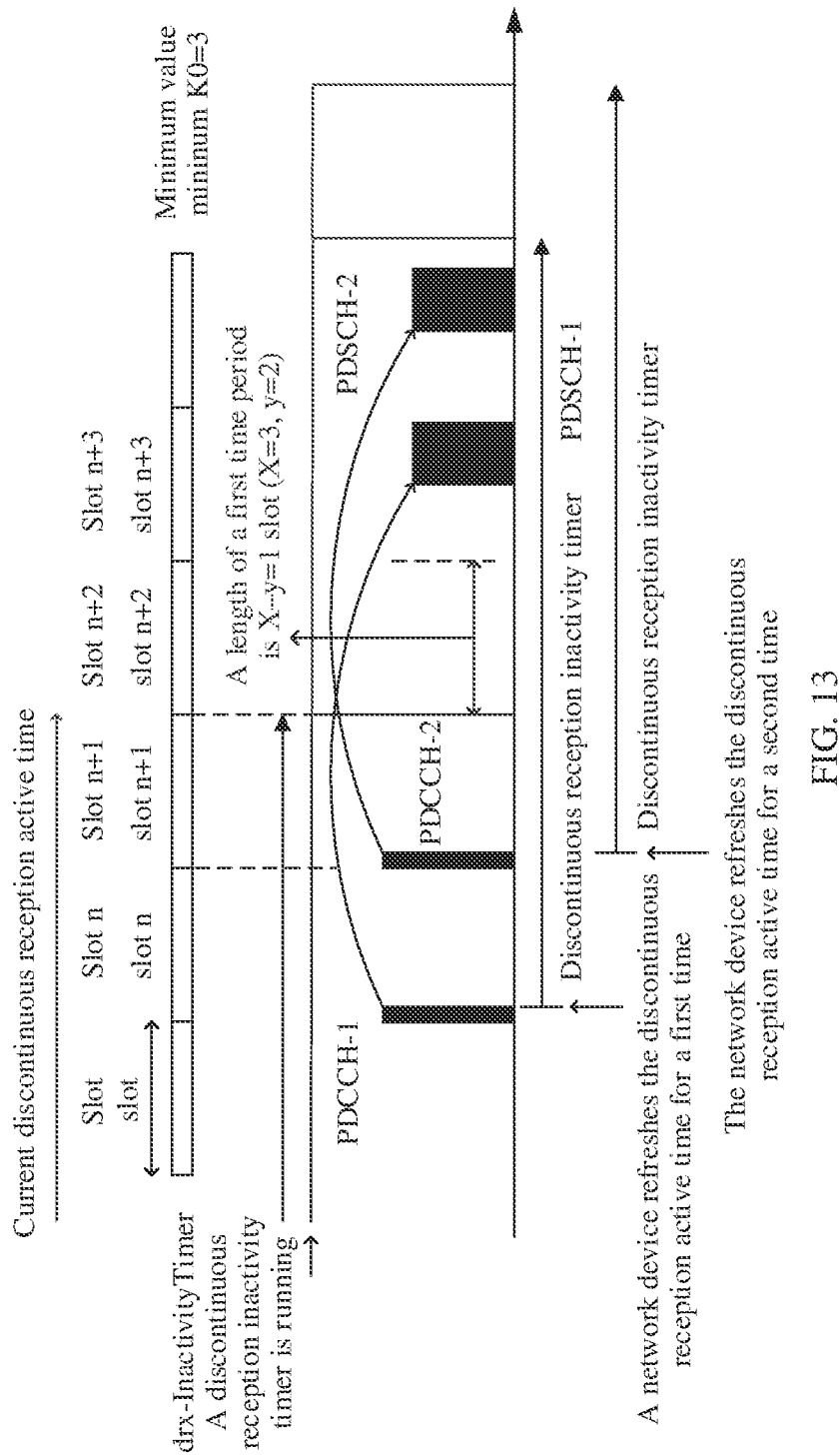
FIG. 13 is a schematic diagram 5 of a first time period according to an embodiment of this application.

Example 2: As shown in FIG. 13, if X=minimum K0=3, both a PDCCH-1 and a PDCCH-2 schedule new downlink data transmission. The PDCCH-1 is sent in a last but one slot of a running time period of a first drx-InactivityTimer, and a second drx-InactivityTimer is restarted on a first symbol after a symbol on which the PDCCH-1 is located. Therefore, the network device no longer sends the PDCCH-2 in a last slot of a running time period of the first drx-InactivityTimer, but in a last but three slot of a running time period of the second drx-InactivityTimer. Because a slot in which the PDCCH-1 is located is the last but one slot of the running time period of the first drx-InactivityTimer, and y=2, a duration of the first time period is X−y=1 slot, and a start location of the first time period is a moment at which natural timing of the first drx-InactivityTimer expires, namely, an end location of a slot n+y−1, that is, an end location of a slot n+1, where n is a slot in which the PDCCH-1 is located. The network device does not send the PDCCH in the first time period. Because the PDCCH-2 is sent in the last but three slot of the running time period of the second drx-InactivityTimer, y=4, and y<X is not met, the first time period does not exist, and a third drx-InactivityTimer is restarted on a first symbol after a symbol on which the PDCCH-2 is located. Therefore, in FIG. 13, the network device does not send the PDCCH only in the first time period. In another time period, the network device may send the PDCCH to schedule the UE.

Manner 2: X=Z.

The first constant value may be specified in advance in a standard. It should be noted that the first constant value Z is associated with a subcarrier spacing (SCS), a first constant value corresponding to a first subcarrier spacing is greater than or equal to a first constant value corresponding to a second subcarrier spacing, and the first subcarrier spacing is greater than the second subcarrier spacing. For example, when SCS=15 kHz/30 kHz, all UE can successfully parse DCI in one slot, and when SCS=60 kHz/120 kHz, the time used by the UE to parse DCI may need to be greater than one slot. For example, all UE can successfully perform parsing before a slot n+2 (in this case, the time used by the UE to parse the DCI may last to an end of the slot n+1, where a slot n is a slot number of a slot in which a PDCCH used to indicate new uplink or downlink data transmission is located). For a relationship between a value of Z and the subcarrier spacing, refer to Table 1 or Table 2.

TABLE 1

| SCS | Z (unit: slots) |
|---|---|
| 15 kHz | 1 |
| 30 kHz | 1 |
| 60 kHz | 2 |
| 120 kHz | 2 |

TABLE 2

| SCS | Z (unit: slots) |
|---|---|
| 15 kHz | 1 |
| 30 kHz | 1 |
| 60 kHz | 1 |
| 120 kHz | 2 |

Table 2 is used as an example. When SCS=15 kHz/30 kHz/60 kHz, Z=1, and when SCS=120 kHz, Z=2. Therefore, the first time period exists only when SCS=120 kHz, and this is because when Z=2, a length X−y of the first time period may be greater than or equal to one slot.

In addition, it should be understood that the first constant value Z may cover parsing time of all first communications devices; in other words, the first constant value Z reflects a minimum requirement for the parsing time of all the first communications devices. For example, n is used to indicate a number of a slot in which the PDCCH is located, and the UE successfully parses the DCI at an end location of a slot n+Z−1. However, a moment at which the UE completes DCI parsing may be located before the end location of the slot n+Z−1.

In the manner 1, the time used by the UE to parse the DCI may be prolonged as minimum K0 increases. In the manner 2, the time used by the UE to parse the DCI cannot be prolonged as minimum K0 increases, but is limited by a constant. The constant reflects a capability of the UE, and time represented by the constant includes the time used by the UE to parse the DCI.

It should be noted that the predefined constant herein may be represented by another symbol, for example, M, N, or Q, provided that the constant can reflect the DCI parsing time. The constant Z may be predefined, or may be configured by the network device for a terminal device (for example, by using radio resource control (RRC) signaling), or reported by the terminal device to the network device by using RRC signaling, and is carried in capability information (UE capability information) or assistance information (UE assistance information) reported by the UE.

Manner 3: X=max(minimum K0, Z).

The manner 3 is a combination of the manner 1 and the manner 2.

In the manner 3, the UE may prolong the DCI parsing time when minimum K0>Z, for example, prolong the DCI parsing time to a slot n+minimum K0−1. However, when minimum K0<Z, because a capability of the UE is limited, the UE cannot accelerate a DCI parsing speed because minimum K0 is decreased, and therefore, the DCI parsing time may still last to a slot n+Z−1. Therefore, X is a larger value of minimum K0 and Z.

In a concept that is the same as the foregoing three possible value manners of X, in another embodiment, the length of the first time period is M slots, M=minimum K0−1, or M=Z−1, or M=max(minimum K0, Z)−1, where minimum K0 represents a minimum value of the slot interval between the PDCCH and the PDSCH, Z represents a first constant value, and Z is a positive integer.

In conclusion, behavior of UE is specified. It is specified that the UE does not expect to receive a PDCCH in a first time period after current discontinuous reception active time, and the network device does not send the PDCCH in the first time period, so that a problem that the network device and the UE have inconsistent understanding of whether the first time period is in the discontinuous reception active time because DCI parsing time exceeds the current discontinuous reception active time can be avoided, network resources can be saved, and power consumption waste can be avoided.

It may be understood that the method described above is applicable to a case in which the PDCCH is located on first several symbols of a slot, for example, is located on first S symbols of a slot, where S=1, or S=2, or S=3. The method is also applicable to a case in which the PDCCH is located at a location of a middle symbol or a location of an end symbol of a slot. When a PDCCH is located on a middle symbol or an end symbol of a slot, in other words, when blind detection search space of the PDCCH appears on a middle symbol or an end symbol of a slot, a DCI parsing speed may be adjusted based on the UE, so that DCI parsing is still completed before a slot n+X.

However, in some cases, it cannot be ensured that DCI parsing is completed before the slot n+X. For example, if first DCI indicating new uplink or downlink data transmission is located on three symbols at an end of a last slot of a first discontinuous reception active time, and X=minimum K0=1, there is no time interval between an end symbol of a symbol on which the first DCI is located and a start symbol of a next slot of a slot n in which the first DCI is located, and therefore, the UE cannot complete DCI parsing at a start moment of a slot n+1. In this case, the time used by the UE to parse the first DCI also exceeds the first discontinuous reception active time. Based on one of the methods described above, for example, it is determined that the duration of the first time period is X−y slots, where y=1, the duration of the first time period is 0, and the problem that the network device and the UE have inconsistent understanding of whether the first time period is in the discontinuous reception active time because the DCI parsing time exceeds the current discontinuous reception active time cannot be resolved.

To avoid this problem, it may be agreed that if the DCI is located at S symbol locations at an end of a slot, or if the DCI is not located at S symbol locations (S=1, 2, or 3) at a beginning of a slot, it is specified that the duration of the first time period is X+1−y slots. X and y are described above. Alternatively, it is specified that the duration of the first time period is X slots. X is described above.

Figure 14:
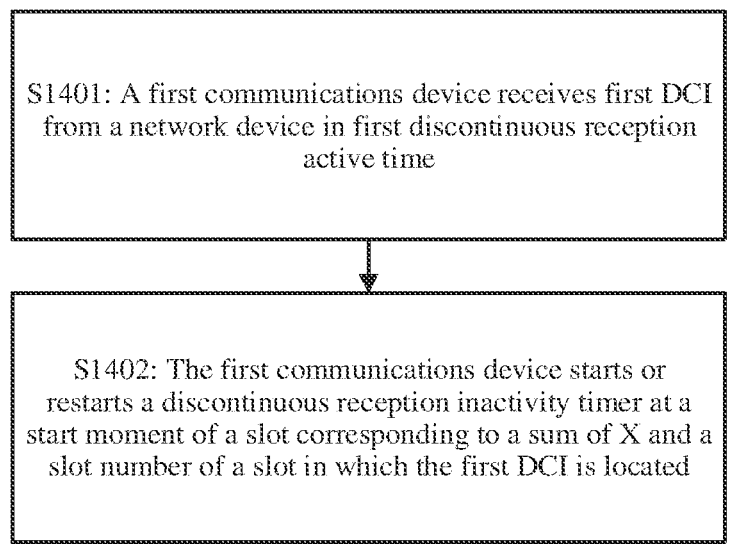
FIG. 14 is an overview flowchart 2 of a communication method according to an embodiment of this application.

As shown in FIG. 14, an embodiment of this application provides a communication method. The method includes the following steps.

S1401: A first communications device receives first DCI from a network device in a first discontinuous reception active time, where the first DCI is used to indicate new uplink or downlink data transmission.

Accordingly, the network device sends the first DCI to the first communications device in the first discontinuous reception active time.

S1402: The first communications device starts or restarts a discontinuous reception inactivity timer at a start moment of a slot corresponding to a sum of X and a slot number of a slot in which the first DCI is located, where X is an integer greater than or equal to 0.

Accordingly, the network device starts or restarts the discontinuous reception inactivity timer at the start moment of the slot corresponding to the sum of X and the slot number of the slot in which the first DCI is located.

The start moment of the slot corresponding to the sum of X and the slot number of the slot in which the first DCI is located is a start symbol of the slot corresponding to the sum of X and the slot number of the slot in which the first DCI is located.

X=minimum K0, or X=Z, or X=max(minimum K0, Z), where minimum K0 represents a minimum value of the slot interval between a PDCCH and a PDSCH, and Z represents a first constant value.

In addition, that the first communications device and the network device start or restart the discontinuous reception inactivity timer at the start moment of the slot corresponding to the sum of X and the slot number of the slot in which the first DCI is located may alternatively be equivalently described as follows: The first communications device and the network device start or restart the discontinuous reception inactivity timer at an end moment of a slot corresponding to a sum of X−1 and the slot number of the slot in which the first DCI is located.

Figure 15:
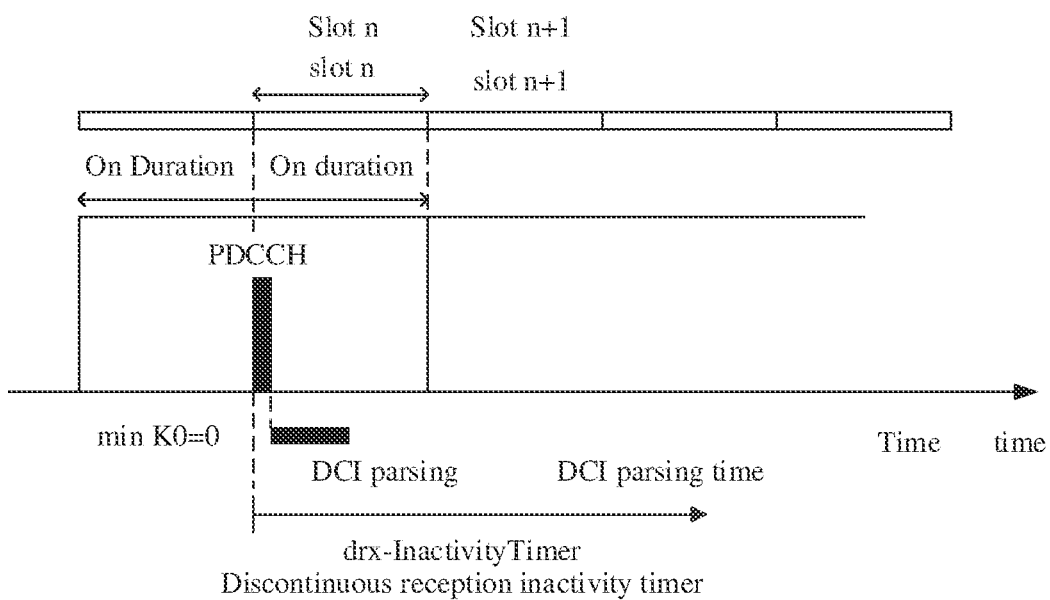
FIG. 15 is a schematic diagram 1 of a start moment of a discontinuous reception inactivity timer according to an embodiment of this application.
Figure 16:
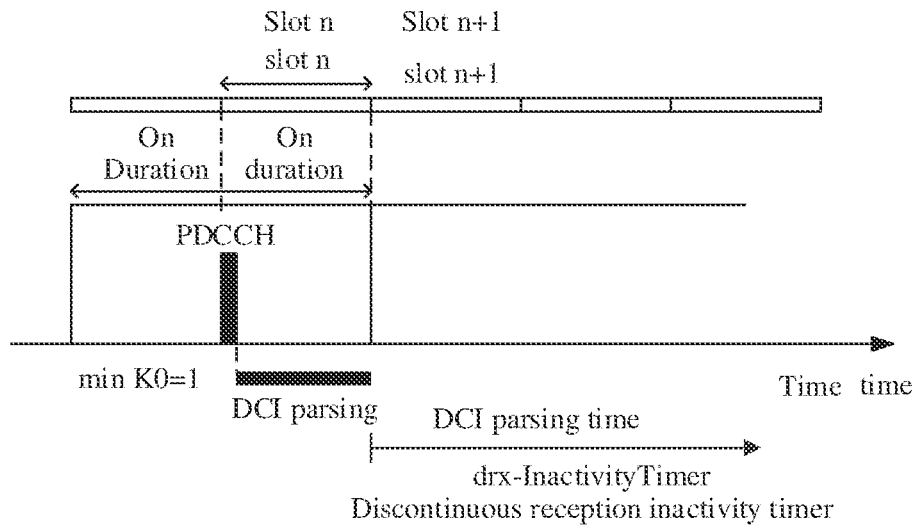
FIG. 16 is a schematic diagram 2 of a start moment of a discontinuous reception inactivity timer according to an embodiment of this application.
Figure 17:
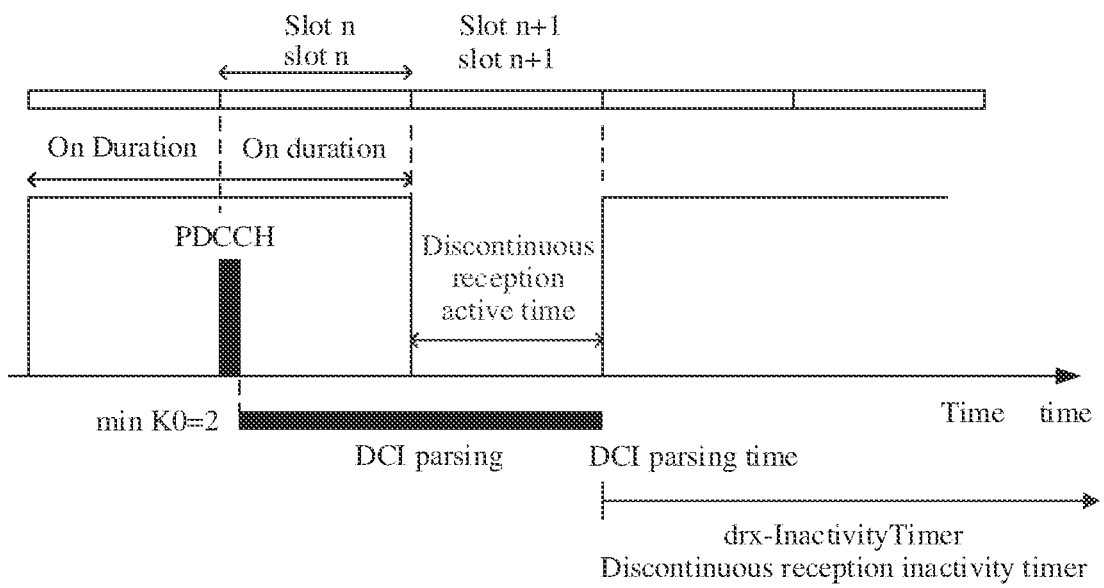
FIG. 17 is a schematic diagram 3 of a start moment of a discontinuous reception inactivity timer according to an embodiment of this application.

For example, in FIG. 15, X=minimum K0=0; in FIG. 16, X=minimum K0=1; and in FIG. 17, X=minimum K0=2. Although DCI parsing time is drawn in the figures, the DCI parsing time is not limited in this embodiment.

In FIG. 15, after successfully parsing the DCI, the UE starts the drx-InactivityTimer. An initial value of the timer needs to count from a start symbol of a slot in which the PDCCH is located; in other words, a time length between a start location of the slot in which the PDCCH is located and a location at which DCI parsing succeeds needs to be deducted from a timing value of the UE when starting the drx-InactivityTimer.

In FIG. 16, both the network device and the UE start the drx-InactivityTimer at a start moment of a slot n+1. Therefore, the slot n+1 after on duration is discontinuous reception active time, so that a problem that the network device and the UE have inconsistent understanding of whether this time period is in the discontinuous reception active time is not caused.

In FIG. 17, both the network device and the UE start the drx-InactivityTimer at an end moment of a slot n+1. Therefore, the slot n+1 after on duration is not discontinuous reception active time, so that a problem that the network device and the UE have inconsistent understanding of whether this time period is in the discontinuous reception active time is not caused.

It should be understood that for descriptions of three possible values of X, refer to the foregoing embodiment shown in FIG. 7.

In addition, a value of X may alternatively be X=max (minimum K0, 1). In this way, when minimum K0=0, a moment at which the network device and the UE start the drx-InactivityTimer may be not a start moment of the slot in which the first DCI is located, but is a start moment of a next slot of the slot in which the first DCI is located. In this way, a case in which a start moment of the drx-InactivityTimer is before the PDCCH when minimum K0=0 in FIG. 15 does not occur.

In the foregoing embodiment, start time of the drx-InactivityTimer is modified, and both the network device and UE simultaneously start or restart the drx-InactivityTimer after the UE successfully parses DCI, so that a problem that the network device and the UE have inconsistent understanding of the discontinuous reception active time can be avoided.

It should be understood that the symbol of the foregoing slot may be an orthogonal frequency division multiplexing (OFDM) symbol. When a time length of a symbol can be ignored, the symbol may be referred to as a moment of a time period, for example, a start moment or an end moment. When a time length of a symbol cannot be ignored, when a moment is described as a symbol, a start moment or an end moment of the symbol is described. For example, a start moment of a slot is a start moment of a start symbol of the slot.

It may be understood that the method described above is applicable to a case in which the PDCCH is located on first several symbols of a slot, for example, is located on first S symbols of a slot, where S=1, or S=2, or S=3. The method is also applicable to a case in which the PDCCH is located at a location of a middle symbol or a location of an end symbol of a slot. When a PDCCH is located on a middle symbol or an end symbol of a slot, in other words, when blind detection search space of the PDCCH appears on a middle symbol or an end symbol of a slot, a DCI parsing speed may be adjusted based on the UE, so that DCI parsing is still completed before a slot n+X.

However, in some cases, it cannot be ensured that DCI parsing is completed before the slot n+X. For example, if first DCI indicating new uplink or downlink data transmission is located on three symbols at an end of a last slot of a first discontinuous reception active time, and X=minimum K0=1, there is no time interval between an end symbol of a symbol on which the first DCI is located and a start symbol of a next slot of a slot n in which the first DCI is located, and therefore, the UE cannot complete DCI parsing at a start moment of a slot n+1. In this case, the time used by the UE to parse the first DCI also exceeds the first discontinuous reception active time. Based on one of the methods described above, for example, it is determined that the drx-InactivityTimer is started or restarted at a start moment of a slot n+minimum K0, a problem that the network device and the UE have inconsistent understanding of the discontinuous reception active time because the DCI parsing time exceeds the current discontinuous reception active time cannot be resolved.

To avoid this problem, it may be agreed that if the DCI is located at S symbol locations at an end of a slot, or if the DCI is not located at S symbol locations (S=1, 2, or 3) at a beginning of a slot, it is specified that the drx-InactivityTimer is started or restarted in a slot n+X+1. X is described above.

Figure 18:
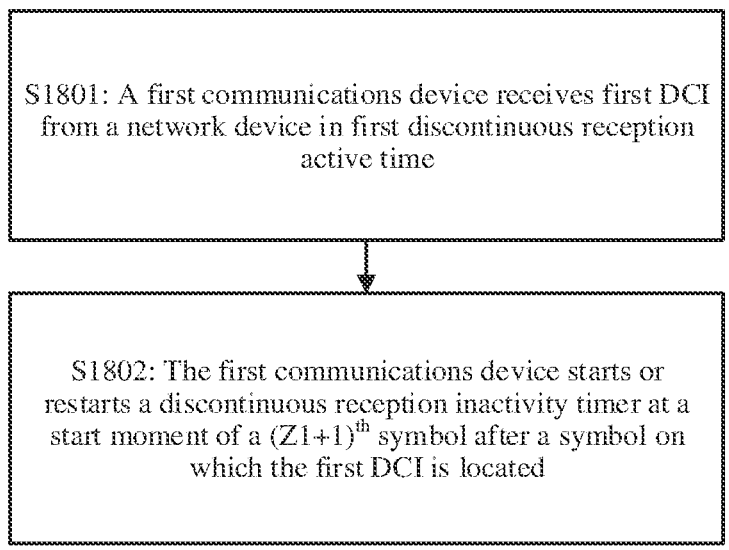
FIG. 18 is an overview flowchart 3 of a communication method according to an embodiment of this application.

As shown in FIG. 18, an embodiment of this application provides a communication method. The method includes the following steps.

S1801: A first communications device receives first DCI from a network device in a first discontinuous reception active time, where the first DCI is used to indicate new uplink or downlink data transmission.

Accordingly, the network device sends the first DCI to the first communications device in the first discontinuous reception active time.

S1802: The first communications device starts or restarts a discontinuous reception inactivity timer at a start moment of a $(Z1+1)^{th}$ symbol after a symbol on which the first DCI is located, where Z1 is a second constant value, and Z1 is an integer greater than or equal to 1.

Accordingly, the network device starts or restarts the discontinuous reception inactivity timer at the start moment of the $(Z1+1)^{th}$ symbol after the symbol on which the first DCI is located.

The second constant value Z1 is associated with a subcarrier spacing, a second constant value corresponding to a first subcarrier spacing is greater than or equal to a second constant value corresponding to a second subcarrier spacing, and the first subcarrier spacing is greater than the second subcarrier spacing.

Specifically, a second constant value Z1 may be predefined, and the second constant value Z1 represents a quantity of symbols and represents duration in which the UE parses the DCI.

The second constant value Z1 may be predefined in a standard, or may be configured by the network device for the first communications device (for example, by using RRC signaling), or reported by the first communications device to the network device by using RRC signaling, for example, carried in capability information (UE capability information) or assistance information (UE assistance information) reported by the UE. For example, a value of the second constant value Z1 is shown in Table 3 or Table 4.

TABLE 3

| SCS | Z1 (unit: OFDM symbols) |
| --- | --- |
| 15 kHz | 7 |
| 30 kHz | 14 |
| 60 kHz | 14 |
| 120 kHz | 28 |

TABLE 4

| SCS | Z1 (unit: OFDM symbols) |
| --- | --- |
| 15 kHz | 7 |
| 30 kHz | 14 |
| 60 kHz | 21 |
| 120 kHz | 28 |

In the foregoing embodiment, start time of the drx-InactivityTimer is modified, and both the network device and UE simultaneously start or restart the drx-InactivityTimer after the UE successfully parses DCI, so that a problem that the network device and the UE have inconsistent understanding of the discontinuous reception active time can be avoided.

Figure 19:
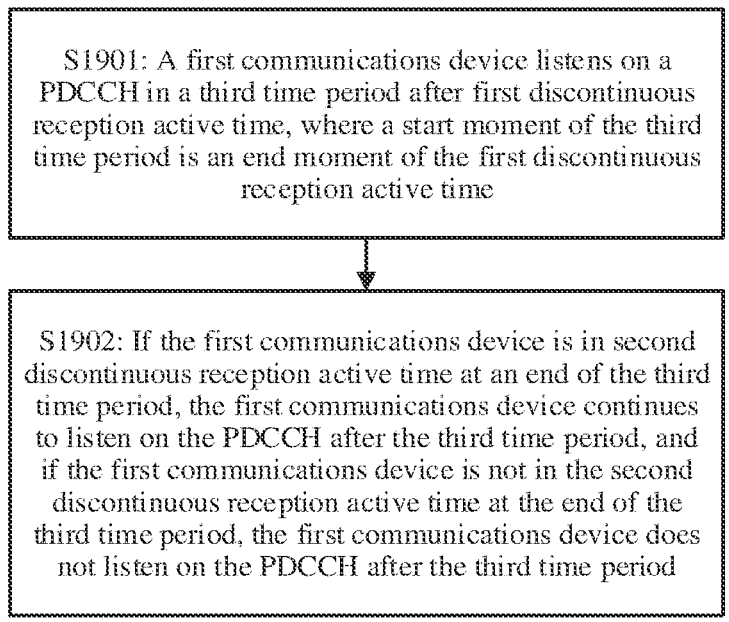
FIG. 19 is an overview flowchart 4 of a communication method according to an embodiment of this application.

As shown in FIG. 19, an embodiment of this application provides a communication method. The method includes the following steps.

S1901: A first communications device monitors a PDCCH in a third time period after a first discontinuous reception active time, where a start moment of the third time period is an end moment of the first discontinuous reception active time.

S1902: If the first communications device is in a second discontinuous reception active time at an end of the third time period, the first communications device continues to monitor the PDCCH after the third time period, and if the first communications device is not in the second discontinuous reception active time at the end of the third time period, the first communications device does not monitor the PDCCH after the third time period.

In an example embodiment, a length of the third time period is X–y slots. The first communications device receives at least one piece of first DCI from the network device in a second time period in the first discontinuous reception active time, where the first DCI is carried by using the PDCCH and is used to indicate new uplink or downlink data transmission, and the first communications device does not receive the first DCI from the network device in a last but X–1 slot of the first discontinuous reception active time. X is an integer, X=minimum K0, or X=Z, or X=max(minimum K0, Z), minimum K0 represents a minimum value of the slot interval between the PDCCH and a PDSCH, Z represents a first constant value, Z is a positive integer, a start moment of the second time period is a start moment of a last but X–2 slot of the first discontinuous reception active time, and an end moment of the second time period is the end moment of the first discontinuous reception active time. A first piece of first DCI received by the first communications device in the second time period is located in a last but y–1 slot of the first discontinuous reception active time, y<X, and y is a positive integer.

In an example embodiment, a length of the third time period is M slots. M=minimum K0–1, or M=Z–1, or M=max(minimum K0, Z)–1, where minimum K0 represents a minimum value of the slot interval between the PDCCH and a PDSCH, and Z is a first constant value.

The first constant value Z is associated with a subcarrier spacing, a first constant value corresponding to a first subcarrier spacing is greater than or equal to a first constant value corresponding to a second subcarrier spacing, and the first subcarrier spacing is greater than the second subcarrier spacing.

Figure 20:
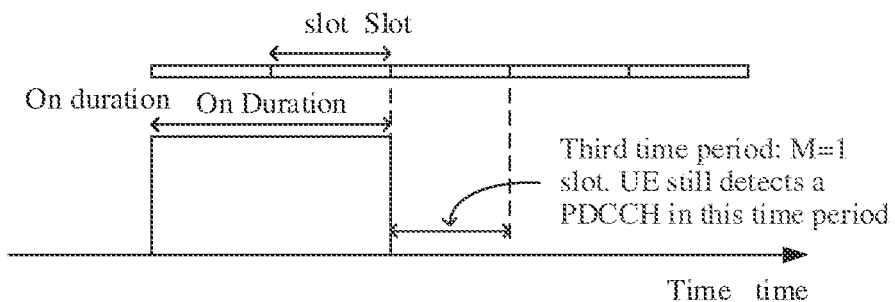
FIG. 20 is a schematic diagram 1 of a third time period according to an embodiment of this application.

As shown in FIG. 20, if minimum K0=2, a length of the third time period is M=minimum K0–1=1 slot, a start moment of the third time period is an end location of on duration, and the first discontinuous reception active time is a time period of the on duration. In the on duration, the network device does not schedule new uplink or downlink data transmission by using the PDCCH, and the UE still monitors the PDCCH in the third time period after the on duration. The UE does not monitor the PDCCH after the third time period.

Figure 21:
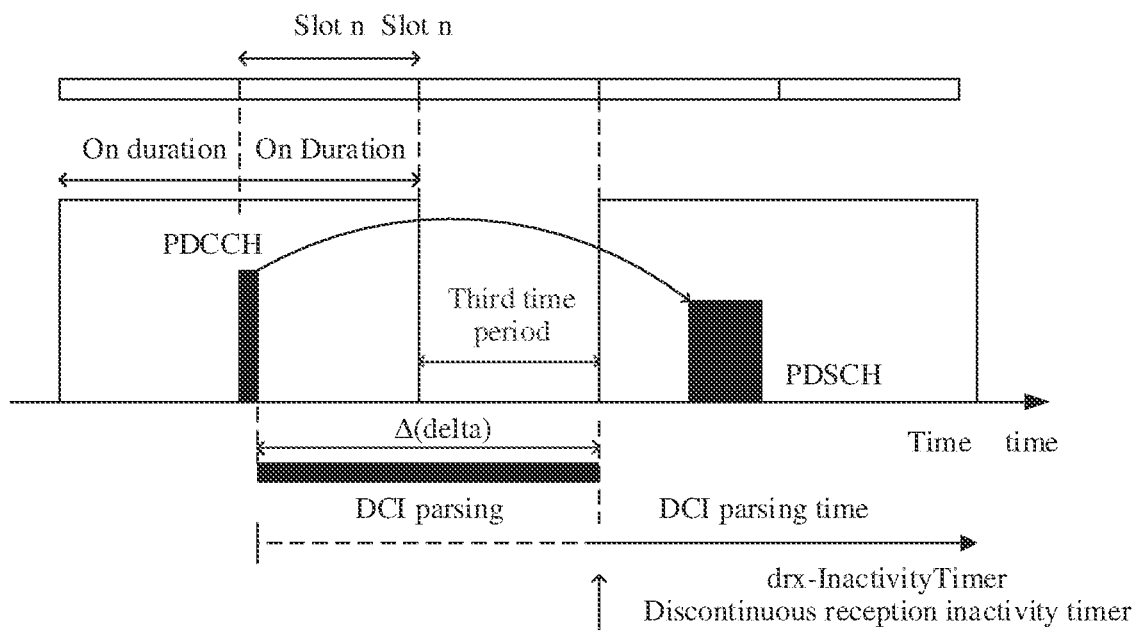
FIG. 21 is a schematic diagram 2 of a third time period according to an embodiment of this application.

As shown in FIG. 21, if minimum K0=2, a length of the third time period is M=minimum K0–1=1 slot, a start moment of the third time period is an end location of on duration, and the first discontinuous reception active time is a time period of the on duration. The network device schedules new downlink data transmission in a last slot of the on duration by using the PDCCH, but time used by the UE to parse the DCI lasts to an end of a first slot after the on duration (namely, an end of a slot n+1), and the UE still monitors the PDCCH in the third time period. In this way, the network device may also send the PDCCH in the third time period, so that a data delay can be reduced. At an end of the third time period, because the UE starts the drx-InactivityTimer to re-enter discontinuous reception active time, namely, the second discontinuous reception active time, the UE continues to monitor the PDCCH after the third time period.

It should be understood that, in this embodiment, DCI parsing time of the UE is not limited, and the time at which the UE starts or restarts the drx-InactivityTimer is not limited. For example, in FIG. 21, the UE may complete DCI parsing before an end of a slot n+minimum K0−1, for example, complete DCI parsing at the middle of the third time period.

In addition, that the network device sends second DCI to the first communications device in the third time period includes but is not limited to the following several possible scenarios:

In a first possible scenario, the network device sends the second DCI to the first communications device in the third time period, the second DCI is carried by using the PDCCH, and the second DCI is not used to indicate new uplink or downlink data transmission.

The second DCI is used to indicate retransmission of uplink or downlink data, or a DCI format of the second DCI is a DCI format of a non-scheduling type. For example, the DCI format is a DCI format 2_0/2_1/2_2/2_3 or a DCI format for transmitting a power saving signal, where the power saving signal includes a maximum quantity of multiple-input multiple-output (MIMO) layers (including uplink and downlink) that indicate the UE to work, or is used to indicate to switch values of minimum K0 and/or K2, or is specifically used to indicate bandwidth part (BWP) switching.

In a second possible scenario, if the network device sends the first DCI to the first communications device in the second time period in the first discontinuous reception active time, where the first DCI is carried by using the PDCCH and is used to indicate new uplink or downlink data transmission, the network device sends the first DCI to the first communications device in the third time period.

A start moment of the second time period is a start moment of a last but X−2 slot of the first discontinuous reception active time, and an end moment of the second time period is the end moment of the first discontinuous reception active time. X=minimum K0, or X=Z, or X=max(minimum K0, Z), where minimum K0 represents a minimum value of the slot interval between the PDCCH and a PDSCH, and Z represents a first constant value.

In addition, if a network device does not send, in last M+1 slots of the first discontinuous reception active time, the PDCCH used to indicate new uplink or downlink data transmission, the network device does not send, in the third time period after the first discontinuous reception active time, the PDCCH used to indicate new uplink or downlink data transmission.

As shown in FIG. 20, minimum K0=2 and M=minimum K0−1=1. If the network device does not schedule new uplink or downlink data transmission by using the PDCCH in last two slots of the on duration, the network device does not schedule new uplink or downlink data transmission in the third time period after the on duration even if the UE is still listening on the PDCCH in the third time period.

Figure 22:
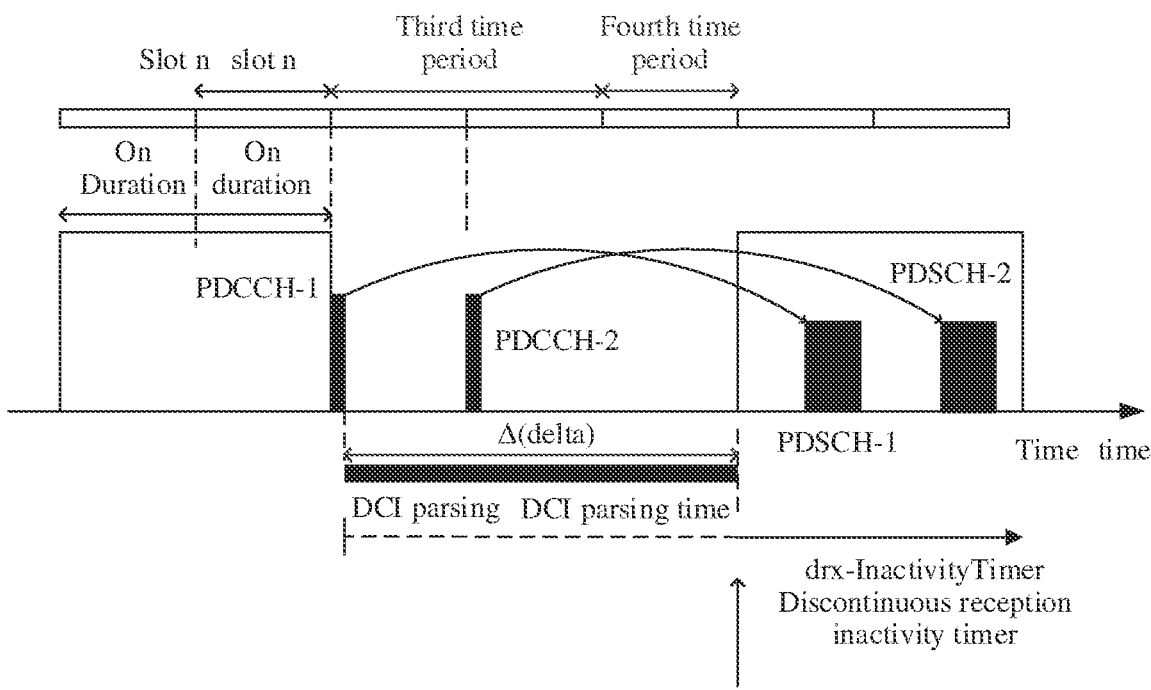
FIG. 22 is a schematic diagram of a third time period and a fourth time period according to an embodiment of this application.

As shown in FIG. 22, minimum K0=3 and M=minimum K0−1=2. If the network device does not schedule new data transmission by using the PDCCH in last two slots in the on duration, but schedules new uplink or downlink data transmission in the third time period after the on duration, the network device still cannot continue to send the PDCCH in a next slot after the third time period because the UE may successfully parse, at an end of the next slot after the third time period, DCI transmitted on a PDCCH-1, to learn that the network device schedules new uplink or downlink data transmission. Consequently, this causes a problem that the network device and the UE have inconsistent understanding of whether the next slot after the third time period is in the discontinuous reception active time.

Therefore, if the network device does not send, in last M+1 slots of the first discontinuous reception active time, the PDCCH used to indicate new uplink or downlink data transmission, but the network device sends, in the third time period, the PDCCH used to indicate new uplink or downlink data transmission, the network device does not send the PDCCH in a fourth time period, and a start moment of the fourth time period is an end location of the third time period. After the fourth time period, the network device may continue to send the PDCCH.

Duration of the fourth time period is X−y slots. X=M+1. If M=minimum K0−1, X=minimum K0; if M=Z−1, X=Z; and if M=max(minimum K0, Z)−1, X=max(minimum K0, Z). y indicates that a slot that is in the third time period and in which a first PDCCH used to indicate new uplink or downlink data transmission is located is a last but y−1 slot of the third time period.

As shown in FIG. 22, if M=minimum K0−1, Minimum K0=3, and M=2, a duration of the third time period is M=2 slots. The network device does not send, in the first discontinuous reception active time (namely, the on duration), a PDCCH used to indicate new downlink data transmission, and the UE continues to monitor the PDCCH in the third time period. Both a PDCCH-1 and a PDCCH-2 that are sent by the network device in the third time period indicate the PDCCH used to indicate new downlink data transmission, and the PDCCH-1 is a first PDCCH used to indicate new downlink data transmission in the third time period. The PDCCH-1 is located in a last but one slot of the third time period, and therefore y=2. It can be learned from X=M+1 that X=3. Therefore, the duration of the fourth time period is X−y=1 slot, and a start location of the fourth time period is the end location of the third time period. The UE does not monitor the PDCCH in the fourth time period, and the network device does not send the PDCCH in the fourth time period. After successfully parsing DCI transmitted on the PDCCH-1, the UE starts the drx-InactivityTimer, and then the UE enters discontinuous reception active time, namely, the second discontinuous reception active time. Therefore, the UE continues to monitor the PDCCH after the fourth time period, and the network device may also continue to send the PDCCH after the fourth time period.

In the foregoing embodiment, once the network device schedules new uplink or downlink data transmission by using the PDCCH at an end of the first discontinuous reception active time (for example, a last slot of the first discontinuous reception active time), the network device may continuously schedule the UE after the first discontinuous reception active time, and the UE continues to monitor the PDCCH in the third time period after the first discontinuous reception active time. Therefore, the UE does not miss detection of any PDCCH. In this way, a problem that the network device and the UE have inconsistent understanding of whether a time period that may exist after the first discontinuous reception active time is in discontinuous reception active time is avoided; and in addition, when there is data receiving/sending, the network device can also schedule the UE as soon as possible, so that a data scheduling delay is reduced.

It may be understood that the method described above is applicable to a case in which the PDCCH is located on first several symbols of a slot, for example, is located on first S symbols of a slot, where S=1, or S=2, or S=3. The method is also applicable to a case in which the PDCCH is located at a location of a middle symbol or a location of an end symbol of a slot. When a PDCCH is located on a middle symbol or an end symbol of a slot, in other words, when blind detection search space of the PDCCH appears on a middle symbol or an end symbol of a slot, a DCI parsing speed may be adjusted based on the UE, so that DCI parsing is still completed before a slot n+X.

However, in some cases, it cannot be ensured that DCI parsing is completed before the slot n+X. For example, if first DCI indicating new uplink or downlink data transmission is located on three symbols at an end of a last slot of a first discontinuous reception active time, and X=minimum K0=1, there is no time interval between an end symbol of a symbol on which the first DCI is located and a start symbol of a next slot of a slot n in which the first DCI is located, and therefore, the UE cannot complete DCI parsing at a start moment of a slot n+1. In this case, the time used by the UE to parse the first DCI also exceeds the first discontinuous reception active time. Based on one of the methods described above, for example, it is determined that the length of the third time period is X−y slots, where y=1, and therefore duration of the third time period is 0, a problem that the network device and the UE have inconsistent understanding of the discontinuous reception active time because the DCI parsing time exceeds the current discontinuous reception active time cannot be resolved, and the network device cannot schedule the UE as soon as possible when there is data receiving/sending.

To avoid this problem, it may be agreed that if the DCI is located at S symbol locations at an end of a slot, or if the DCI is not located at S symbol locations (S=1, 2, or 3) at a beginning of a slot, it is specified that the duration of the third time period is X+1−y slots. X and y are described above. Alternatively, it is specified that the duration of the third time period is X slots. X is described above.

In the foregoing embodiments provided in this application, various solutions of the communication method provided in the embodiments of this application are separately described from perspectives of each network element and interaction between network elements. It may be understood that, to implement the foregoing functions, the network elements, such as the network device and the terminal device, include a corresponding hardware structure and/or software module that is used to perform each function. A person skilled in the art should be easily aware that with reference to units and algorithm steps of each example described in the embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 23:
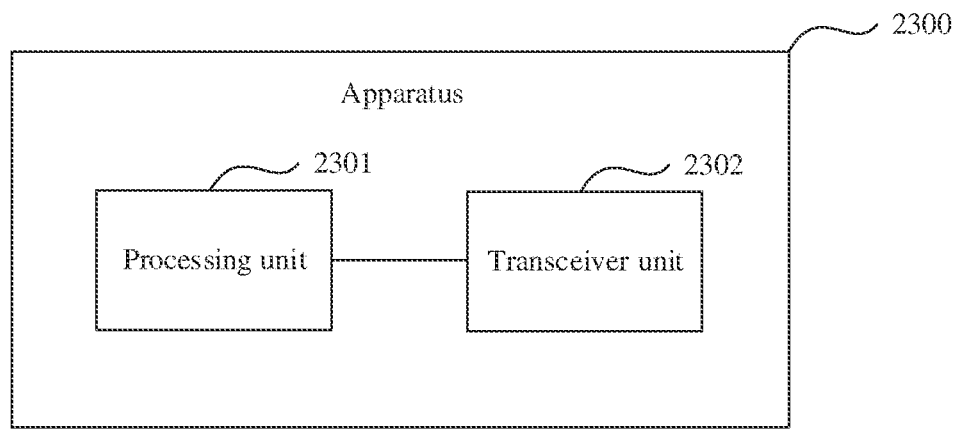
FIG. 23 is a schematic diagram 1 of a structure of an apparatus according to an embodiment of this application.

Same as the foregoing concept, as shown in FIG. 23, an embodiment of this application further provides an apparatus 2300. The apparatus 2300 includes a transceiver unit 2302 and a processing unit 2301.

For example, the apparatus 2300 is configured to implement a function of the first communications device in the foregoing method. The apparatus may be a terminal device, or may be an apparatus in the terminal device, such as a chip system.

The transceiver unit 2302 receives first downlink control information (DCI) from a network device in a first discontinuous reception active time, where the first DCI is used to indicate new uplink or downlink data transmission.

The processing unit 2301 does not expect to receive a physical downlink control channel (PDCCH) from the network device in a first time period after the first discontinuous reception active time, where a start moment of the first time period is an end moment of the first discontinuous reception active time, and an end moment of the first time period is in a second discontinuous reception active time.

The transceiver unit 2302 monitors the PDCCH after the first time period.

For example, the apparatus 2300 is configured to implement a function of the first communications device in the foregoing method. The apparatus may be a terminal device, or may be an apparatus in the terminal device, such as a chip system.

The transceiver unit 2302 receives first DCI from a network device in a first discontinuous reception active time, where the first DCI is used to indicate new uplink or downlink data transmission.

The processing unit 2301 starts or restarts a discontinuous reception inactivity timer at a start moment of a slot corresponding to a sum of X and a slot number of a slot in which the first DCI is located, where X is an integer greater than or equal to 0.

For example, the apparatus 2300 is configured to implement a function of the first communications device in the foregoing method. The apparatus may be a terminal device, or may be an apparatus in the terminal device, such as a chip system.

The transceiver unit 2302 monitors a PDCCH in a third time period after a first discontinuous reception active time, where a start moment of the third time period is an end moment of the first discontinuous reception active time.

If the processing unit 2301 determines that the apparatus is in a second discontinuous reception active time at an end of the third time period, the transceiver unit 2302 continues to monitor the PDCCH after the third time period.

If the processing unit 2301 determines that the apparatus is not in the second discontinuous reception active time at the end of the third time period, the transceiver unit 2302 does not monitor the PDCCH after the third time period.

For example, the apparatus 2300 is configured to implement a function of the first communications device in the foregoing method. The apparatus may be a terminal device, or may be an apparatus in the terminal device, such as a chip system.

The transceiver unit 2302 receives first DCI from a network device in a first discontinuous reception active time, where the first DCI is used to indicate new uplink or downlink data transmission.

The processing unit 2301 starts or restarts a discontinuous reception inactivity timer at a start moment of a $(Z1+1)^{th}$ symbol after a symbol on which the first DCI is located, where Z1 is a second constant value, and Z1 is an integer greater than or equal to 1.

In an example, the apparatus 2300 is configured to implement functions of the network device in the foregoing methods. The apparatus may be a network device, or may be an apparatus in the network device.

The processing unit 2301 invokes the transceiver unit 2302 to send first DCI to a first communications device in a first discontinuous reception active time, where the first DCI is used to indicate new uplink or downlink data transmission.

The processing unit 2301 invokes the transceiver unit 2302 not to send a PDCCH to the first communications device in a first time period after the first discontinuous reception active time.

The processing unit 2301 invokes the transceiver unit 2302 to send the PDCCH to the first communications device after the first time period.

A start moment of the first time period is an end moment of the first discontinuous reception active time, and an end moment of the first time period is in second discontinuous reception on duration.

In an example, the apparatus 2300 is configured to implement functions of the network device in the foregoing methods. The apparatus may be a network device, or may be an apparatus in the network device.

The transceiver unit 2302 sends first DCI to a first communications device in a first discontinuous reception active time, where the first DCI is used to indicate new uplink or downlink data transmission.

The processing unit 2301 starts or restarts a discontinuous reception inactivity timer at a start moment of a slot corresponding to a sum of X and a slot number of a slot in which the first DCI is located, where X is an integer greater than or equal to 0.

In an example, the apparatus 2300 is configured to implement functions of the network device in the foregoing methods. The apparatus may be a network device, or may be an apparatus in the network device.

The transceiver unit 2302 sends a PDCCH to a first communications device in a third time period after first discontinuous reception active time, where a start moment of the third time period is an end moment of the first discontinuous reception active time. If the processing unit 2301 determines that the apparatus is in a second discontinuous reception active time at an end of the third time period, the transceiver unit 2302 sends the PDCCH to the first communications device after the third time period. If the processing unit 2301 determines that the apparatus is not in the second discontinuous reception active time at the end of the third time period, the transceiver unit 2302 does not send the PDCCH to the first communications device after the third time period.

In an example, the apparatus 2300 is configured to implement functions of the network device in the foregoing methods. The apparatus may be a network device, or may be an apparatus in the network device.

The transceiver unit 2302 sends first DCI to a first communications device in a first discontinuous reception active time, where the first DCI is used to indicate new uplink or downlink data transmission. The processing unit 2301 starts or restarts a discontinuous reception inactivity timer at a start moment of a $(Z1+1)^{th}$ symbol after a symbol on which the first DCI is located, where Z1 is a second constant value, and Z1 is an integer greater than or equal to 1.

For specific execution processes of the processing unit 2301 and the transceiver unit 2302, refer to the descriptions in the foregoing method embodiments. Division into modules in the embodiments of this application is an example, is merely logical function division, and may be other division during actual implementation. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

As another optional variation, the apparatus may be a chip system. In this embodiment of this application, the chip system may include a chip, or may include a chip and another discrete component. For example, the apparatus includes a processor and an interface, and the interface may be an input/output interface. The processor completes functions of the processing unit 2301, and the interface completes functions of the transceiver unit 2302. The apparatus may further include a memory. The memory is configured to store a program that may be run on the processor, and the processor implements the methods in the foregoing embodiments when executing the program.

Figure 24:
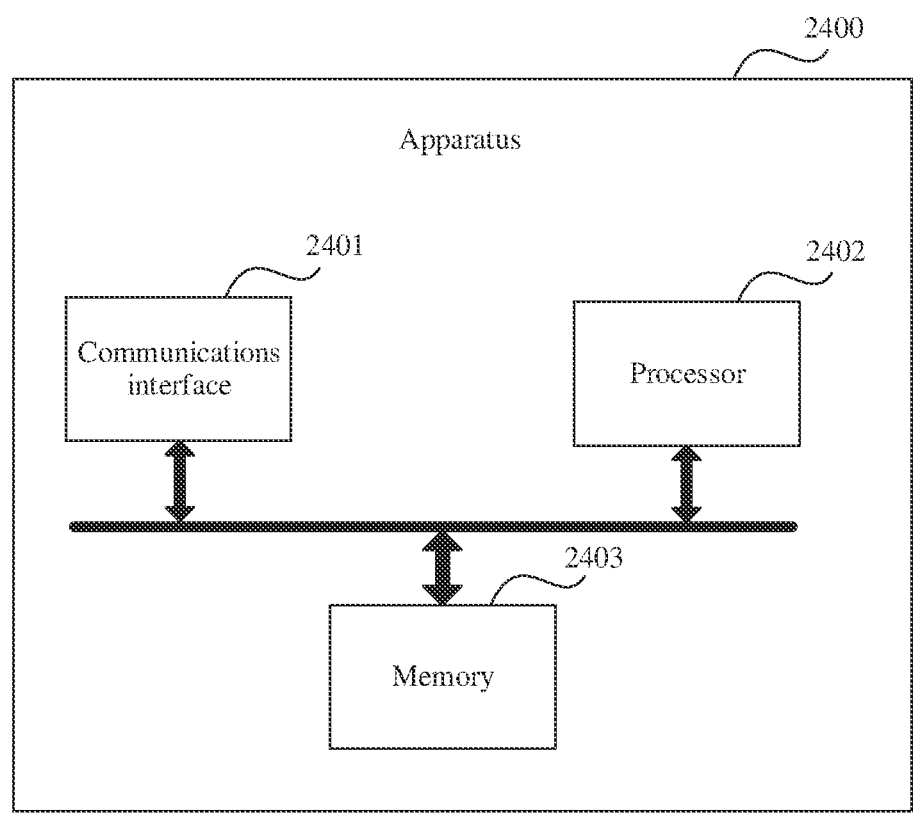
FIG. 24 is a schematic diagram 2 of a structure of an apparatus according to an embodiment of this application.

Same as the foregoing concept, as shown in FIG. 24, an embodiment of this application further provides an apparatus 2400. The apparatus 2400 includes a communications interface 2401, at least one processor 2402, and at least one memory 2403. The communications interface 2401 is configured to communicate with another device by using a transmission medium, so that an apparatus in the apparatus 2400 can communicate with the another device. The memory 2403 is configured to store a computer program. The processor 2402 invokes the computer program stored in the memory 2403 to send and receive data through the communications interface 2401, to implement the methods in the foregoing embodiments.

For example, when the apparatus is a network device, the memory 2403 is configured to store a computer program, and the processor 2402 invokes the computer program stored in the memory 2403 to perform, by using the communications interface 2401, the method performed by the network device in the foregoing embodiments. For example, when the apparatus is a first communications device, the memory 2403 is configured to store a computer program, and the processor 2402 invokes the computer program stored in the memory 2403 to perform, by using the communications interface 2401, the method performed by the terminal device in the foregoing embodiments.

In this embodiment, the communications interface 2401 may be a transceiver, a circuit, a bus, a module, or a communications interface of another type. The processor 2402 may be a general-purpose processor, a digital signal processor, an application-specific integrated circuit, a field programmable gate array or another programmable logic device, a discrete gate or transistor logic device, or a discrete hardware component. The processor 2402 may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor. The memory 2403 may be a non-volatile memory, for example, a hard disk drive (HDD) or a solid-state drive (SSD), or may be a volatile memory, for example, a random access memory (RAM). The memory is any other medium that can carry or store expected program code in a form of an instruction structure or a data structure and that can be accessed by a computer, but is not limited thereto. The memory in this embodiment may alternatively be a circuit or any other apparatus that can implement a storage function. The memory 2403 is coupled to the processor 2402. Coupling in this embodiment is indirect coupling or a communication connection between apparatuses, units, or modules, may be in an electrical form, a mechanical form, or another form, and is used for information exchange between the apparatuses, the units, or the modules. In another implementation, the memory 2403 may alternatively be located outside the apparatus 2400. The processor 2402 may cooperate with the memory 2403. The processor 2402 may execute program instructions stored in the memory 2403. At least one of the at least one memory 2403 may alternatively be included in the processor 2402. A connection medium between the communications interface 2401, the processor 2402, and the memory 2403 is not limited in this embodiment. For example, in this embodiment, the memory 2403, the processor 2402, and the communications interface 2401 in FIG. 24 may be connected by using a bus, and the bus may be classified into an address bus, a data bus, a control bus, and the like.

It may be understood that the apparatus in the foregoing embodiment shown in FIG. 23 may be implemented by the apparatus 2400 shown in FIG. 24. Specifically, the processing unit 2301 may be implemented by the processor 2402, and the transceiver unit 2302 may be implemented by the communications interface 2401.

An embodiment of this application further provides a computer-readable storage medium. The computer-readable storage medium stores a computer program. When the computer program is run on a computer, the computer is enabled to perform the method in the foregoing embodiments.

All or some of the methods in the embodiments of this application may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on a computer, the procedures or the functions according to the embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing embodiments are merely used to describe the technical solutions of this application in detail. The descriptions of the foregoing embodiments are merely intended to help understand the methods of the embodiments of the present invention, and shall not be construed as a limitation on the embodiments of the present invention. Variations or replacements readily determined by a person skilled in the art shall fall within the protection scope of the embodiments of the present invention.

What is claimed is:

1. A communication method, comprising:
    receiving, by a first communications device, first downlink control information (DCI) from a network device in a first discontinuous reception active time, wherein the first DCI indicates new uplink or downlink data transmission;
    skipping listening on, by the first communications device, a physical downlink control channel (PDCCH) from the network device in a first time period after the first discontinuous reception active time, wherein a start moment of the first time period is an end moment of the first discontinuous reception active time, and an end moment of the first time period is in a second discontinuous reception active time; and
    listening on, by the first communications device, the PDCCH after the first time period,
    wherein the receiving of the first DCI from the network device in the first discontinuous reception active time comprises:
    receiving, by the first communications device, at least one piece of the first DCI from the network device in a second time period in the first discontinuous reception active time, and failing to receive, by the first communications device, the first DCI from the network device in a last but X−1 slot of the first discontinuous reception active time, wherein
    X is an integer, X=minimum K0, or X=Z, or X=max (minimum K0, Z), minimum K0 represents a minimum value of a slot interval between the PDCCH and a physical downlink shared channel (PDSCH), Z represents a first constant value, Z is a positive integer, a start moment of the second time period is a start moment of a last but X−2 slot of the first discontinuous reception active time, and an end moment of the second time period is the end moment of the first discontinuous reception active time.

2. The method according to claim 1, wherein a length of the first time period is X−y slots; and
    a first piece of the first DCI received by the first communications device in the second time period is located in a last but y−1 slot of the first discontinuous reception active time, y<X, and y is a positive integer.

3. The method according to claim 1, wherein a length of the first time period is M slots; and
    M=minimum K0−1, or M=Z−1, or M=max(minimum K0, Z)−1, wherein minimum K0 represents the minimum value of the slot interval between the PDCCH and the PDSCH, Z represents the first constant value, and Z is a positive integer.

4. The method according to claim 1, wherein the first constant value Z is associated with a subcarrier spacing, a constant value corresponding to a first subcarrier spacing is greater than or equal to a constant value corresponding to a second subcarrier spacing, and the first subcarrier spacing is greater than the second subcarrier spacing.

5. A communication method, comprising:
    sending, by a network device, first downlink control information (DCI) to a first communications device in a first discontinuous reception active time, wherein the first DCI indicates new uplink or downlink data transmission;
    skipping sending, by the network device, a physical downlink control channel (PDCCH) to the first communications device in a first time period after the first discontinuous reception active time; and
    sending, by the network device, the PDCCH to the first communications device after the first time period;
    wherein
    a start moment of the first time period is an end moment of the first discontinuous reception active time, and an end moment of the first time period is in a second discontinuous reception active time, wherein the sending, by the network device, first DCI to the first communications device in the first discontinuous reception active time comprises:

sending, by the network device, at least one piece of the first DCI to the first communications device in a second time period in the first discontinuous reception active time, and skipping sending, by the network device, the first DCI to the first communications device in a last but X−1 slot of the first discontinuous reception active time, wherein X is an integer, X=minimum K0, or X=Z, or X=max (minimum K0, Z), minimum K0 represents a minimum value of a slot interval between the PDCCH and a physical downlink shared channel (PDSCH), Z represents a first constant value, Z is a positive integer, a start moment of the second time period is a start moment of a last but X−2 slot of the first discontinuous reception active time, and an end moment of the second time period is the end moment of the first discontinuous reception active time.

6. The method according to claim 5, wherein a length of the first time period is X−y slots; and
a first piece of the first DCI sent by the network device in the second time period is located in a last but y−1 slot of the first discontinuous reception active time, y<X, and y is a positive integer.

7. The method according to claim 5, wherein a length of the first time period is M slots; and
M=minimum K0−1, or M=Z−1, or M=max(minimum K0, Z)−1, wherein minimum K0 represents the minimum value of the slot interval between the PDCCH and the PDSCH, Z represents the first constant value, and Z is a positive integer.

8. The method according to claim 5, wherein the first constant value Z is associated with a subcarrier spacing, a constant value corresponding to a first subcarrier spacing is greater than or equal to a constant value corresponding to a second subcarrier spacing, and the first subcarrier spacing is greater than the second subcarrier spacing.

9. A communication device, comprising:
at least one processor; and
a memory storing programming instructions for execution by the at least one processor, the programming instructions instructing the communication device to perform operations comprising:
receiving first downlink control information (DCI) from a network device in a first discontinuous reception active time, wherein the first DCI indicates new uplink or downlink data transmission;
skipping listening on a physical downlink control channel (PDCCH) from the network device in a first time period after the first discontinuous reception active time, wherein a start moment of the first time period is an end moment of the first discontinuous reception active time, and an end moment of the first time period is in a second discontinuous reception active time; and
listening on the PDCCH after the first time period,
wherein the receiving of the first DCI from the network device in the first discontinuous reception active time comprises:
receiving at least one piece of the first DCI from the network device in a second time period in the first discontinuous reception active time, and failing to receive, by the communications device, the first DCI from the network device in a last but X−1 slot of the first discontinuous reception active time, wherein X is an integer, X=minimum K0, or X=Z, or X=max (minimum K0, Z), minimum K0 represents a minimum value of a slot interval between the PDCCH and a physical downlink shared channel (PDSCH), Z represents a first constant value, Z is a positive integer, a start moment of the second time period is a start moment of a last but X−2 slot of the first discontinuous reception active time, and an end moment of the second time period is the end moment of the first discontinuous reception active time.

10. The device according to claim 9, wherein a length of the first time period is X−y slots; and
a first piece of the first DC received by the communications device in the second time period is located in a last but y−1 slot of the first discontinuous reception active time, y<X, and y is a positive integer.

11. The device according to claim 9, wherein a length of the first time period is M slots; and
M=minimum K0−1, or M=Z−1, or M=max(minimum K0, Z)−1, wherein minimum K0 represents the minimum value of the slot interval between the PDCCH and the PDSCH, Z represents the first constant value, and Z is a positive integer.

12. The device according to claim 9, wherein the first constant value Z is associated with a subcarrier spacing, a constant value corresponding to a first subcarrier spacing is greater than or equal to a constant value corresponding to a second subcarrier spacing, and the first subcarrier spacing is greater than the second subcarrier spacing.

13. A communication device, comprising:
at least one processor; and
a memory storing programming instructions for execution by the at least one processor, the programming instructions instructing the communication device to perform operations comprising:
sending first downlink control information (DCI) to a first communications device in a first discontinuous reception active time, wherein the first DCI indicates new uplink or downlink data transmission;
skipping sending a physical downlink control channel (PDCCH) to the first communications device in a first time period after the first discontinuous reception active time; and
sending the PDCCH to the first communications device after the first time period, wherein
a start moment of the first time period is an end moment of the first discontinuous reception active time, and an end moment of the first time period is in a second discontinuous reception active time,
wherein the sending the first DCI to the first communications device in the first discontinuous reception active time comprises:
sending, by the communication device, at least one piece of the first DCI to the first communications device in a second time period in the first discontinuous reception active time, and skipping sending, by the communication device, the first DCI to the first communications device in a last but X−1 slot of the first discontinuous reception active time, wherein X is an integer, X=minimum K0, or X=Z, or X=max (minimum K0, Z), minimum K0 represents a minimum value of a slot interval between the PDCCH and a physical downlink shared channel (PDSCH), Z represents a first constant value, Z is a positive integer, a start moment of the second time period is a start moment of a last but X−2 slot of the first discontinuous reception active time, and an end moment of the second time period is the end moment of the first discontinuous reception active time.

14. The device according to claim 13, wherein a length of the first time period is X−y slots; and
a first piece of the first DCI sent by the communication device in the second time period is located in a last but y−1 slot of the first discontinuous reception active time, y<X, and y is a positive integer.

15. The device according to claim 13, wherein a length of the first time period is M slots; and
M=minimum K0−1, or M=Z−1, or M=max(minimum K0, Z)−1, wherein minimum K0 represents the minimum value of the slot interval between the PDCCH and the PDSCH, Z represents the first constant value, and Z is a positive integer.

16. The device according to claim 13, wherein the first constant value Z is associated with a subcarrier spacing, a constant value corresponding to a first subcarrier spacing is greater than or equal to a constant value corresponding to a second subcarrier spacing, and the first subcarrier spacing is greater than the second subcarrier spacing.

* * * * *

UNITED STATES PATENT AND TRADEMARK OFFICE
CERTIFICATE OF CORRECTION

PATENT NO. : 12,250,748 B2
APPLICATION NO. : 17/587297
DATED : March 11, 2025
INVENTOR(S) : Zhanzhan Zhang et al.

It is certified that error appears in the above-identified patent and that said Letters Patent is hereby corrected as shown below:

In the Claims

Column 34, Claim 1, Line 24, change "X=minimum KO" to --X=minimum K0--;

Column 34, Claim 1, Line 25, change "X=max(minimum KO, Z)" to --X=max(minimum K0, Z)--;

Column 34, Claim 1, Line 25, change "minimum KO" to --minimum K0--;

Column 35, Claim 5, Line 14, change "X=minimum KO" to --X=minimum K0--;

Column 35, Claim 5, Line 15, change "X=max(minimum KO, Z)" to --X=max(minimum K0, Z)--;

Column 35, Claim 5, Line 15, change "minimum KO" to --minimum K0--;

Column 36, Claim 9, Line 3, change "X=minimum KO" to --X=minimum K0--;

Column 36, Claim 9, Line 4, change "X=max(minimum KO, Z)" to --X=max(minimum K0, Z)--;

Column 36, Claim 9, Line 4, change "minimum KO" to --minimum K0--;

Column 36, Claim 10, Line 3, change "first DC" to --first DCI--;

Column 36, Claim 13, Line 62, change "X=minimum KO" to --X=minimum K0--;

Column 36, Claim 13, Line 63, change "X=max(minimum KO, Z)" to --X=max(minimum K0, Z)--; and Column 36, Claim 13, Line 63, change "minimum KO" to --minimum K0--.

Signed and Sealed this
Eighth Day of April, 2025

Coke Morgan Stewart
*Acting Director of the United States Patent and Trademark Office*